(12) United States Patent
Eisen et al.

(10) Patent No.: US 11,196,730 B2
(45) Date of Patent: Dec. 7, 2021

(54) METHODS AND SYSTEMS FOR NETWORK-ENABLED ACCOUNT CREATION USING OPTICAL DETECTION

(71) Applicant: Trusona, Inc., Scottsdale, AZ (US)

(72) Inventors: Ori Eisen, Scottsdale, AZ (US); David Michael Kopack, Scottsdale, AZ (US); Nikolas Mangu-Thitu, Lexington, KY (US)

(73) Assignee: Trusona, Inc., Scottsdale, AZ (US)

( * ) Notice: Subject to any disclaimer, the term of this patent is extended or adjusted under 35 U.S.C. 154(b) by 0 days.

(21) Appl. No.: 16/432,119

(22) Filed: Jun. 5, 2019

(65) Prior Publication Data

US 2020/0092272 A1 Mar. 19, 2020

Related U.S. Application Data

(63) Continuation of application No. PCT/US2017/065790, filed on Dec. 12, 2017.
(Continued)

(51) Int. Cl.
*H04L 29/06* (2006.01)
*G06F 21/44* (2013.01)
(Continued)

(52) U.S. Cl.
CPC .............. *H04L 63/08* (2013.01); *G06F 21/44* (2013.01); *G06K 7/1417* (2013.01); *G06K 19/06037* (2013.01); *H04L 9/32* (2013.01)

(58) Field of Classification Search
CPC H04L 63/08; H04L 9/32; G06F 21/44; G06K 7/1417; G06K 19/06037
(Continued)

(56) References Cited

U.S. PATENT DOCUMENTS 5,913,542 A 6/1999 Belucci et al.
5,960,411 A 9/1999 Hartman et al.
(Continued)

FOREIGN PATENT DOCUMENTS

JP 2002259345 A 9/2002
JP 2005148982 A 6/2005
(Continued)

OTHER PUBLICATIONS

U.S. Appl. No. 16/247,835 Office Action dated Jul. 10, 2020.
(Continued)

*Primary Examiner* — Jacob Lipman
(74) *Attorney, Agent, or Firm* — Wilson Sonsini Goodrich & Rosati

(57) ABSTRACT

Provided is a network-enabled method for creating an online account using a network of devices. The method comprises: receiving by an authentication system, a request to create an online account with an online server; generating a visual graphical code by the authentication system, which is displayed on a display screen and comprises a validation identity; acquiring image data of the visual graphical code from a user device with aid of optical detection apparatus, by capturing an image of the visual graphical code displayed on the display screen; processing the image data to extract the validation identity; based on the validation identity identifying an online serve provider associated with the online server and user information categories associated with the online account; and based on identification information related to the user identifying the user, and the data to the online server for the online account with the online server.

16 Claims, 15 Drawing Sheets

Related U.S. Application Data

(60) Provisional application No. 62/432,855, filed on Dec. 12, 2016, provisional application No. 62/458,985, filed on Feb. 14, 2017, provisional application No. 62/492,384, filed on May 1, 2017.

(51) Int. Cl.
  *G06K 7/14* (2006.01)
  *G06K 19/06* (2006.01)
  *H04L 9/32* (2006.01)

(58) Field of Classification Search
  USPC .......................................................... 380/229
  See application file for complete search history.

(56) References Cited

U.S. PATENT DOCUMENTS

| | | | |
|---|---|---|---|
| 7,379,921 B1 | 5/2008 | Kiliccote | |
| 7,578,436 B1 | 8/2009 | Kiliccote et al. | |
| 7,613,929 B2 | 11/2009 | Cohen et al. | |
| 7,991,388 B1 | 8/2011 | Becker et al. | |
| 8,291,220 B2 | 10/2012 | Singh | |
| 8,385,971 B2 | 2/2013 | Rhoads et al. | |
| 8,550,903 B2 | 10/2013 | Lyons et al. | |
| 8,655,782 B2 | 2/2014 | Poon et al. | |
| 8,805,110 B2 | 8/2014 | Rodriguez et al. | |
| 8,924,712 B2 | 12/2014 | Varadarajan et al. | |
| 8,929,877 B2 | 1/2015 | Rhoads et al. | |
| 8,954,758 B2 | 2/2015 | Leoutsarakos | |
| 8,973,095 B2 | 3/2015 | Smith et al. | |
| 8,983,207 B1 | 3/2015 | Ran et al. | |
| 9,010,627 B1 | 4/2015 | Prasad et al. | |
| 9,106,423 B1* | 8/2015 | Salinas | H04L 67/02 |
| 9,118,662 B2 | 8/2015 | Corrion et al. | |
| 9,143,496 B2 | 9/2015 | Etchegoyen | |
| 9,178,890 B1 | 11/2015 | Bhimanaik | |
| 9,213,853 B2 | 12/2015 | Leotsarakos et al. | |
| 9,418,326 B1 | 8/2016 | Narayanaswami | |
| 9,491,160 B2 | 11/2016 | Livesay et al. | |
| 9,596,237 B2 | 3/2017 | Law et al. | |
| 9,613,352 B1 | 4/2017 | Leoutsarakos | |
| 9,769,664 B1 | 9/2017 | Kavaler | |
| 2007/0063050 A1 | 3/2007 | Attia et al. | |
| 2007/0102521 A1 | 5/2007 | Petersson et al. | |
| 2007/0153715 A1* | 7/2007 | Covington | H04L 12/2898 370/315 |
| 2009/0150294 A1 | 6/2009 | March et al. | |
| 2010/0040293 A1 | 2/2010 | Hermann et al. | |
| 2010/0268949 A1 | 10/2010 | Schuetze | |
| 2011/0200234 A1 | 8/2011 | Takahashi et al. | |
| 2011/0219427 A1 | 9/2011 | Hito et al. | |
| 2012/0035924 A1 | 2/2012 | Jitkoff et al. | |
| 2012/0150742 A1 | 6/2012 | Poon et al. | |
| 2012/0173311 A1 | 7/2012 | Chang et al. | |
| 2012/0203605 A1 | 8/2012 | Morgan et al. | |
| 2012/0323717 A1* | 12/2012 | Kirsch | G06F 21/31 705/26.1 |
| 2013/0116964 A1 | 5/2013 | Van et al. | |
| 2013/0124411 A1 | 5/2013 | Kobres et al. | |
| 2013/0167208 A1 | 6/2013 | Shi et al. | |
| 2013/0182002 A1 | 7/2013 | Macciola et al. | |
| 2013/0198078 A1 | 8/2013 | Kirsch | |
| 2013/0246155 A1 | 9/2013 | Kandanala et al. | |
| 2013/0262858 A1* | 10/2013 | Neuman | H04L 63/083 713/155 |
| 2013/0306721 A1 | 11/2013 | Meng | |
| 2014/0020073 A1 | 1/2014 | Ronda et al. | |
| 2014/0105449 A1 | 4/2014 | Caton et al. | |
| 2014/0173697 A1 | 6/2014 | Barbir | |
| 2014/0282933 A1 | 9/2014 | Etchegoyen | |
| 2014/0337930 A1 | 11/2014 | Hoyos et al. | |
| 2015/0178724 A1 | 6/2015 | Ngo et al. | |
| 2015/0254443 A1 | 9/2015 | Blessing et al. | |
| 2015/0310545 A1 | 10/2015 | Deoliveira et al. | |
| 2015/0365238 A1 | 12/2015 | Hui et al. | |
| 2016/0048494 A1 | 2/2016 | Feng | |
| 2016/0057248 A1 | 2/2016 | Tankha et al. | |
| 2016/0125180 A1 | 5/2016 | Smith et al. | |
| 2016/0140357 A1 | 5/2016 | Newell | |
| 2016/0269181 A1 | 9/2016 | Hon et al. | |
| 2016/0294821 A1 | 10/2016 | Neuman et al. | |
| 2017/0251014 A1 | 8/2017 | Eisen | |
| 2018/0048474 A1 | 2/2018 | Landrock et al. | |
| 2019/0147159 A1 | 5/2019 | Eisen | |
| 2020/0394176 A1* | 12/2020 | Wu | H04L 63/08 |

FOREIGN PATENT DOCUMENTS

| | | |
|---|---|---|
| JP | 4961214 B2 | 6/2012 |
| JP | 2015503866 A | 2/2015 |
| JP | 2016136352 A | 7/2016 |
| WO | WO-2014022778 A1 | 2/2014 |
| WO | WO-2014059142 A1 | 4/2014 |
| WO | WO-2014075011 A1 | 5/2014 |
| WO | WO-2015089324 A1 | 6/2015 |
| WO | WO-2015093734 A1 | 6/2015 |
| WO | WO-2016141352 A1 | 9/2016 |
| WO | WO-2017147494 A1 | 8/2017 |
| WO | WO-2018022993 A1 | 2/2018 |
| WO | WO-2018111858 | 6/2018 |
| WO | WO-2020041739 | 2/2020 |

OTHER PUBLICATIONS

Co-pending U.S. Appl. No. 16/788,156, filed Feb. 11, 2020.
EP17835339.7 Extended Search Report dated Jan. 7, 2020.
U.S. Appl. No. 15/441,661 Notice of Allowance dated Jan. 13, 2020.
U.S. Appl. No. 16/247,835 Office Action dated Jan. 27, 2020.
EP17881261.6 European Search Report dated Jul. 15, 2020.
Tanaka, et al., A method and its usability for user authentication by utilizing a matrix code reader on mobile phones. Information Security Applications; [Lecture Notes in Computer Science; LNCS] Springer Berlin, pp. 225-236 (2006).
PCT/US2019/047964 International Search Report dated Dec. 13, 2019.
Burr, et al. NIST Special Publication 800-63-2. Electronic Authentication Guideline. National Institute of Standards and Technology. U.S. Department of Commerce. Aug. 2013. 123 pages.
EP17757353.2 The Extended European Search Report dated Jun. 11, 2019.
International Search Report and Written Opinion dated May 15, 2017 for International PCT Patent Application No. PCT/US2017/019454.
International Search Report and Written Opinion dated Nov. 1, 2017 for International Patent Application No. PCT/US2017/044371.
PCT/US2017/065790 International Search Report and Written Opinion dated Mar. 22, 2018.
U.S. Appl. No. 15/441,661 Office Action dated Jan. 8, 2019.
U.S. Appl. No. 15/441,661 Office Action dated Jul. 30, 2019.
Co-pending U.S. Appl. No. 17/183,303, inventors Eisen; Ori et al., filed Feb. 23, 2021.
Co-pending U.S. Appl. No. 17/345,473, inventors Eisen; Ori et al., filed Jun. 11, 2021.
U.S. Appl. No. 16/247,835 Notice of Allowance dated Jun. 29, 2021.
U.S. Appl. No. 16/247,835 Notice of Allowance dated May 26, 2021.

* cited by examiner

300

| User ID | User Device ID | User Info 1 | User Info 2 | User Info x | ... |
|---|---|---|---|---|---|
| UID 1 | UDID 1 | UI1-1 | UI2-1 | UIx-1 | |
| UID 2 | UDID 2 | UI1-2 | UI2-2 | UIx-2 | |
| UID 3 | UDID 3 | UI1-3 | UI2-3 | UIx-3 | |
| ⋮ | ⋮ | ⋮ | ⋮ | ⋮ | |

*FIG. 3*

METHODS AND SYSTEMS FOR NETWORK-ENABLED ACCOUNT CREATION USING OPTICAL DETECTION

CROSS-REFERENCE TO RELATED APPLICATIONS

This application is a Continuation Application of International PCT Application No. PCT/US2017/065790, filed on Dec. 12, 2017, which claims the priority and benefit of U.S. Provisional Application No. 62/432,855 filed on Dec. 12, 2016, U.S. Provisional Application No. 62/458,985 filed on Feb. 14, 2017, and U.S. Provisional Application No. 62/492,384 filed on May 1, 2017, the entire contents of which are incorporated herein by reference.

BACKGROUND

Identity theft has become a serious problem for both online users and online service providers. In certain instances, users may pose as other users to defraud online service providers or, alternatively, fraudulent individuals or entities may pose as authentic online service providers to defraud users. To counter increasingly creative methods of identity theft, online service providers have started to add more layers of security measures to verify an individual's identity, such as by requiring more user credentials. When opening an account, for example, an online service provider can request personal and sensitive information.

Oftentimes, manually completing these information requests can be cumbersome, time-consuming, and redundant for users. It can deter users from opening accounts with the online service provider requesting such information. In other instances, a user may be providing information to a fake service provider posing as an authentic service provider, risking a serious identity security hazard.

SUMMARY

Recognized herein is the need for methods and systems for authenticating users and online service providers before opening an online account, and allowing users to open an online account with minimal user input.

In one aspect, a method for creating an online account using a network of devices is provided. The method may comprise: (a) receiving, by an authentication system, a request by a user to create an online account with an online server; (b) generating a visual graphical code in response to said request, by the authentication system, wherein the visual graphical code is configured to be displayed on a display screen and comprises a validation identity; (c) acquiring image data of the visual graphical code from a user device with aid of optical detection apparatus, wherein the image data is acquired by capturing an image of the visual graphical code displayed on the display screen using an imaging device operably coupled to the user device and configured to optically detect the visual graphical code; (d) processing said image data to extract the validation identity; (e) based on the validation identity, identifying an online serve provider associated with the online server and one or more user information categories associated with the online account to be created with the online server; and (0 based on identification information related to the user, identifying the user, and providing information data for the user information categories to the online server for the online account to be created with the online server.

In some embodiments, the display screen is external to the user device. In some cases, the method further comprises identifying the one or more user information categories that is not pre-stored with the authentication system, and prompting the user to provide information according to the identified one or more user information categories via the user device. In some embodiments, the visual graphical code is a one-time barcode that is uniquely associated with opening the online account. In some embodiments, the validation identity is associated with the online server or the online service provider that is operating the online server. In some embodiments, the identification information related to the user comprises a device identifier of the user device. In some embodiments, the identification information is pre-stored with the authentication device. In some embodiments, the method further comprises receiving nonce data along with the image data for detecting a replay attack. In some cases, the nonce data comprises at least two of the following: (i) one or more operational parameters of the imaging, (ii) positional information about the imaging device or the user device, and (iii) characteristics of the image data derived from image processing of the image data. In some cases, the nonce data comprises a physical state of the user device that is obtained by one or more sensors.

In another aspect, an authentication system for creating an online account using a network of devices is provided. The system may comprise: an authentication server in communication with a user device configured to permit a user to create an online account with an online server, wherein the authentication server comprises: (i) a memory for storing a set of software instructions, user information data for each of a plurality of users and a plurality of information categories uniquely associated with each of a plurality of users, and (ii) one or more processors configured to execute the set of software instructions to: (a) receive a request by a user to create an online account with the online server; (b) generate a visual graphical code in response to said request, wherein the visual graphical code is configured to be displayed on a display screen and comprises a validation identity; (c) acquire image data of the visual graphical code from a user device with aid of optical detection apparatus, wherein the image data is acquired by capturing an image of the visual graphical code displayed on the display screen using an imaging device operably coupled to the user device and configured to optically detect the visual graphical code; (d) process the image data to extract the validation identity; (e) based on the validation identity, identify an online service provider associated with the online server and one or more of the plurality of user information categories associated with the online account to be created with the online server; and (f) based on identification information related to the user, identify the user, and provide information data for the one or more user information categories to the online server for the online account to be created with the online server.

In some embodiments, the display screen is external to the user device. In some embodiments, the visual graphical code is a one-time barcode that is uniquely associated with opening the online account. In some embodiments, the validation identity is associated with the online server or the online service provider that is operating the online server. In some embodiments, the identification information related to the user comprises a device identifier of the user device. In some embodiments, the identification information is pre-stored with the authentication system. In some embodiments, the method further comprises receiving nonce data along with the image data for detecting a replay attack. In some cases, the nonce data comprises at least two of the following: (i) one or more operational parameters of the imaging, (ii) positional information about the imaging device or the user device, and (iii) characteristics of the image data derived from image processing of the image data. In some cases, the nonce data comprises a physical state of the user device that is obtained by one or more sensors. In some embodiments, online service provider is pre-registered with the system.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 3 shows examples of user information data that may be stored for each user and/or each user device.

DETAILED DESCRIPTION

Figure 1:
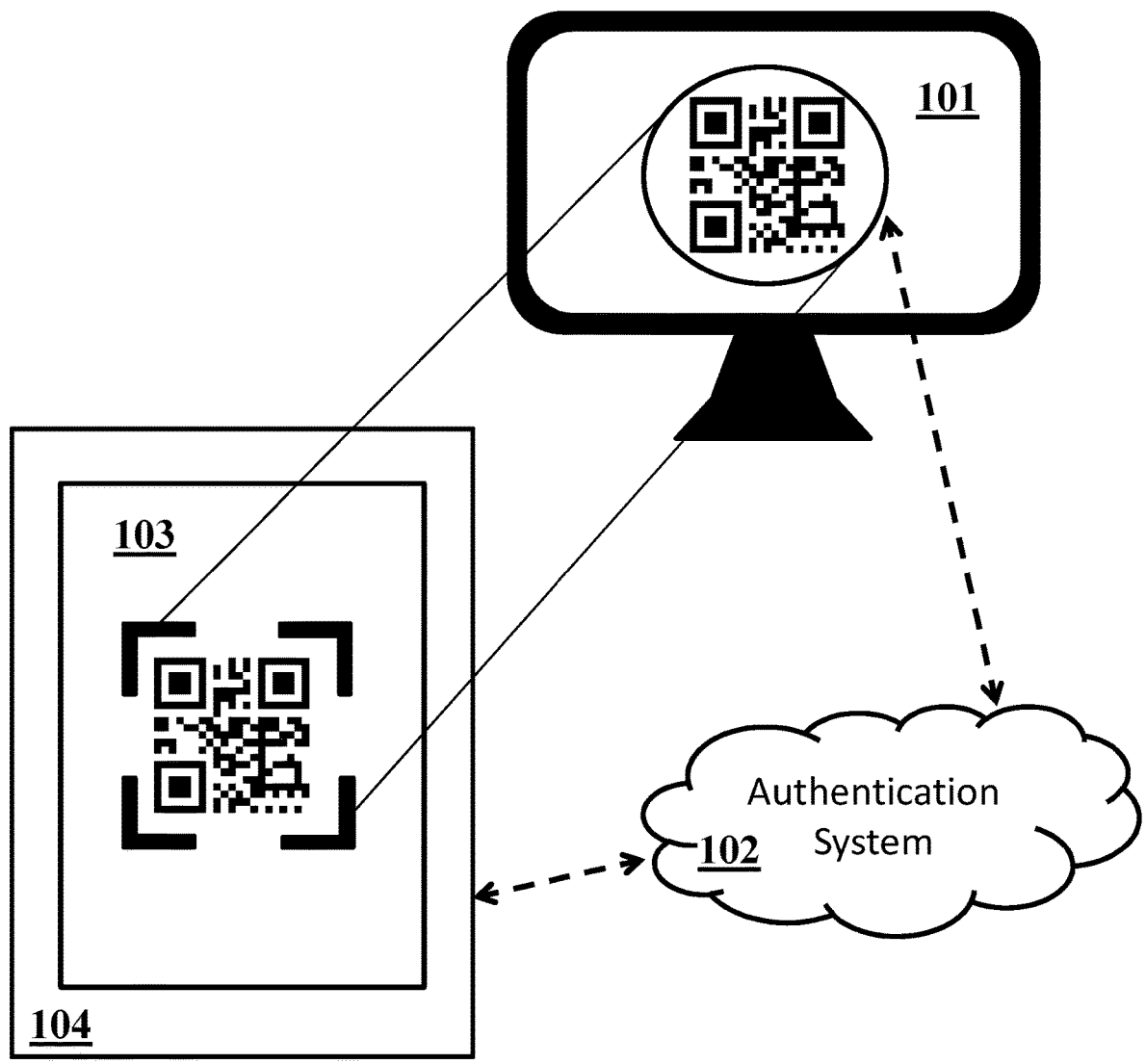
FIG. 1 shows a schematic diagram of a user device capturing a graphical barcode during an authentication session.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "user," as used herein, generally refers to an individual or entity that is capable of opening an online account with an online service provider.

The term "online service provider," as used herein, generally refers to service providers that have an online portal or an online webpage through which users can open an online account. The term "service provider," herein, may be used interchangeably with "online service provider."

The term "online account," as used herein, generally refers to a distinct account that can be created online by a user. An online account can be dedicated to, and/or owned by, a user. User-specific information (e.g., name, address, email, etc.) can be associated with a user's online account. Accordingly, online service providers can identify users by a user's online account with the online service provider. Access to an online account can be protected by associating user credentials, such as a username and accompanying password, of the user to the online account and requiring provision of the user credentials when a user requests access to the online account. Online accounts can be stored in a memory storage of a server (such as a server 201 in FIG. 2).

The term "registered," as used herein, generally refers to the state of having opened an online account with an online service provider. For example, a user can be registered to an online service provider if the user has created an online account with the online service provider.

A user may wish to open an online account with an online service provider for any number of reasons including, for example, to preserve and track a relationship between the user and the online service provider (e.g., financial institutions, educational institutions, etc.), to save frequently used user information (e.g., shipping address) or a history of user activities (e.g., order invoices) with the online service provider (e.g., online retailer), to avoid having to provide redundant information to receive a same or similar service from the online service provider, to conveniently manage a service (e.g., insurance claim) provided by the online service provider (e.g., insurance company) to the user, to engage in social networking services supported by the online service provider (e.g., Facebook®, Instagram®), to take ownership of an online identity (e.g., email) provided by the online service provider (e.g., Gmail®, Outlook®, etc.), and so on.

In some instances, a user may remain mostly anonymous and provide minimal information (e.g., email address, password) to open an online account. In some instances, however, opening an online account may entail providing highly personal and sensitive user information to the online service provider such that it may be in the user's best interests to verify the identity of the online service provider before providing such user information. Similarly, an online service provider may provide highly personal and sensitive services (e.g., providing credit report, bank statement) to registered users such that it may be in the online service provider's best interests to verify the identity of the user before providing such services.

For example, an online service provider can require a user to provide personal information (e.g., full name, previous names, address, phone number, email address, social security number, etc.), employment information (e.g., employer name, employer address, work email, work phone number, years of employment, etc.), financial information (e.g., credit card number, bank name, bank account number, routing number, Paypal® account, etc.), online profile information (e.g., username, nickname, password, security question & answer, etc.), and sometimes copies of physical documents (e.g., driver's license, transcript, statement, utility bill, etc.). In some instances, an online service provider may request additional verification steps to verify a user's identity or to verify user information (e.g., email verification via email code, phone number verification via text code). Oftentimes, manually completing these personal and sensitive information requests can be cumbersome, time-consuming, and redundant for users who have to input the same or similar user information every time they open an online account. It can deter users from opening accounts with the online service provider requesting such voluminous information. In other instances, the user may be providing personal and sensitive information to a fraudulent service provider posing as an authentic service provider, risking a serious identity security hazard.

Provided are methods and systems for opening an online account that can (1) verify the identity of a user to an online service provider and/or verify the identity of an online service provider to a user; and (2) supply user information required for opening an online account with an online service provider to the online service provider, without requiring the user to manually input the user information.

An authentication system can verify the identity of a user and/or an online service provider to the other by generating and analyzing graphical authentication indicia or quick response (QR) codes. For example, each online account opening process may be associated with a unique QR code. The unique QR code can be a one-time unique QR code. A one-time unique QR code may become invalid after the first use of the QR code or, alternatively, the QR code may become invalid after passage of a finite duration of time (e.g., 1 second, 5 seconds, 30 seconds, 1 minute, 5 minutes, 10 minutes, etc.) since the QR code is generated or made available to a user. Alternatively, a one-time unique QR code may become invalid after the occurrence of either of the above two events, whichever comes first. The graphical authentication indicia or QR codes can be used to mutually verify the identities between a user and an online service provider. Alternatively, verification can be one-sided and the user can verify the identity of an online service provider or the online service provider can verify the identity of a user.

A user wishing to open an online account with an online service provider may send a request to the online service provider and/or an authentication system to open an online account with the online service provider. Upon receiving the request, either directly from the user or from the online service provider forwarding the user's request, the authentication system may generate a one-time unique QR code and provide the QR code to the user by displaying the QR code on a display device. Alternatively, the authentication system may provide the QR code to the online service provider, and the online service provider can provide the QR code to the user by displaying the QR code on the display device. The user may capture an image of the QR code provided on the display device with a user device and provide the image of the QR code or an analysis of the image of the QR code to the authentication system through the user device. The authentication system may identify the image of the QR code as associated with the online service provider and thereby verify the identity of the online service provider to the user. Similarly, the authentication system may identify the user device providing the image as associated with the user, and thereby verify the identity of the user to the online service provider.

In another aspect, the authentication system may collect user information from a user and store the user information into a memory storage space of the authentication system prior to the user opening an online account. The user information collected by the authentication system can include any and all information that an online service provider could possibly request from a user when opening an online account with the online service provider. The memory storage space of the authentication system can be a database. Once the identity of a user and/or an online service provider has been verified, the authentication system may identify the type (e.g., name, birth date, email, credit card number, etc.) of user information required for opening an account with the particular online service provider and supply the required user information of the user from the memory storage space of the authentication system to the online service provider. The user may be allowed to approve, reject, or edit one or more type, or field, of user information to be provided to the online service provider before the user information is submitted. Accordingly, the user may open an online account with an online service provider with less, or minimal, manual input of user information.

As previously mentioned, in some situations, users and online service providers may need to verify the identity of the other before proceeding with an account opening process. A visual graphical barcode such as a QR code may be employed to verify the respective identities and/or establish a secured communication between a user and an online service provider.

FIG. 1 shows a schematic illustration of a user device 104 capturing a graphical barcode in accordance with an authentication session. The authentication session may be hosted by a server (such as the server 201 of FIG. 2) on one or more interactive webpages, and accessed by one or more users. The user device 104 can be used to scan a visual graphical barcode such as a QR code displayed on a display device 101. The QR code, or any other visual graphical barcodes, can be provided to the display device 101 by an authentication system 102. The user device 104 and the display device 101 may be separate devices. Alternatively, the user device 104 and the display device 101 may be the same device. For example, a QR code can be displayed on the display screen of the user device 104. The user device 104 can be registered with the authentication system 102.

The user device 104 may be a mobile device (e.g., smartphone, tablet, pager, personal digital assistant (PDA)), a computer (e.g., laptop computer, desktop computer, server), or a wearable device (e.g., smartwatches). A user device can also include any other media content player, for example, a set-top box, a television set, a video game system, or any electronic device capable of providing or rendering data. The user device may optionally be portable. The user device may be handheld. The user device may be a network device capable of connecting to a network, such as a local area network (LAN), wide area network (WAN) such as the Internet, a telecommunications network, a data network, or any other type of network.

The user device 104 may comprise memory storage units which may comprise non-transitory computer readable medium comprising code, logic, or instructions for performing one or more steps. The user device may comprise one or more processors capable of executing one or more steps, for instance in accordance with the non-transitory computer readable media. The user device may comprise a display showing a graphical user interface. The user device may be capable of accepting inputs via a user interactive device. Examples of such user interactive devices may include a keyboard, button, mouse, touchscreen, touchpad, joystick, trackball, camera, microphone, motion sensor, heat sensor, inertial sensor, or any other type of user interactive device. The user device may be capable of executing software or applications provided by one or more authentication systems. One or more applications may or may not be related to reading codes such as graphical barcodes.

In some instances, the software and/or applications may allow the user to scan graphical authentication indicia such as a QR code displayed on another device or the same device, and transmit authentication data between the user device 104 and the authentication system 102 during an authentication session. The software and/or application may have been registered with the authentication system by the user. Optionally, the software and/or application need not be registered with the authentication system, and only the user device may be registered with the authentication system. Optionally, both the software and the user device can be registered with the authentication system. Optionally, the software and/or application may be configured to collect authentication data (e.g., image capture characteristics, time of capture, etc), and encrypt the data before sending them to the authentication server (such as the server 201 in FIG. 2) during an authentication session.

The user device 104 may be, for example, one or more computing devices configured to perform one or more operations consistent with the disclosed embodiments. The user device may be capable of optically detecting one or more visual element, such as a visual code. The user device may utilize an optical detection apparatus. The optical detection apparatus may optically read or scan a visual element. In some embodiments, the user device may comprise an imaging device 103 which is configured to capture a visual graphical element, such as a bar code (e.g., one-dimensional, two-dimensional), text, a picture, a sequence thereof, or any other forms of graphical authentication indicia that is being displayed on display device 101. The imaging device can include a hardware and/or software element. In some embodiments, the imaging device may be a hardware camera sensor operably coupled to the user device. For example, the camera sensor can be embedded in the user device. Alternatively, the imaging device may be located external to the user device, such as connected via cable or wirelessly, and image data of the graphical element may be transmitted to the user device via communication means as described elsewhere herein. The imaging device can be controlled by applications and/or software configured to scan a visual graphical code. For example, the camera may be configured to scan a QR code. Optionally, the software and/or applications may be configured to activate the camera on the user device to scan the code. In some instances, the camera can be controlled by a processor natively embedded in the user device. Optionally, if the display device 101 and the user device 104 are the same device, the imaging device can comprise a screen capturing software (e.g., screenshot) that can be configured to capture and/or scan a QR code on the screen of the user device 104.

The display device 101 may be configured to display a visual graphical code (e.g. a QR code) to the user. In some embodiments, the QR code may be displayed via an interface such as a webpage, application, program, or any appropriate software. The display device 101 can be a monitor, a computer (e.g., laptop computer, desktop computer), a mobile device (e.g., smartphone, tablet, pager, personal digital assistant (PDA)), a vending machine. In some instances, the display device may comprise one or more processors natively embedded in the display device. The display device may optionally be portable. The display device may be handheld.

In some instances, the visual graphical code displayed on the display device 101 and subsequently scanned by imaging device 103 may be a QR code. QR codes are two-dimensional barcodes that encode data by using dark and light modules arranged in a square-like or rectangular shape. QR codes can be optically captured and read by a machine. The barcode may define elements such as the version, format, position, alignment, and timing of the barcode to enable reading and decoding of the barcode. The remainder of the barcode can encode various types of information in any type of suitable format, such as binary or alphanumeric information. The QR code can have various symbol sizes as long as the QR code can be scanned from a reasonable distance by an imaging device. The QR code can be of any image file format (e.g. EPS or SVG vector graphs, PNG, TIF, GIF, or JPEG raster graphics format). The QR code can be based on any of a number of standards. In some instances, a QR code can conform to known standards that can be read by standard QR readers. The information encoded by a QR code may be made up of four standardized types ("modes") of data (numeric, alphanumeric, byte/binary, kanji) or, through supported extensions, virtually any type of data. In some instances, the QR code may be proprietary such that it can be read only by an authenticated application, provided by the authentication system, running on a user device. In some instances, only the authentication system or the authenticated application can encrypt or decrypt the QR code.

Figure 2:
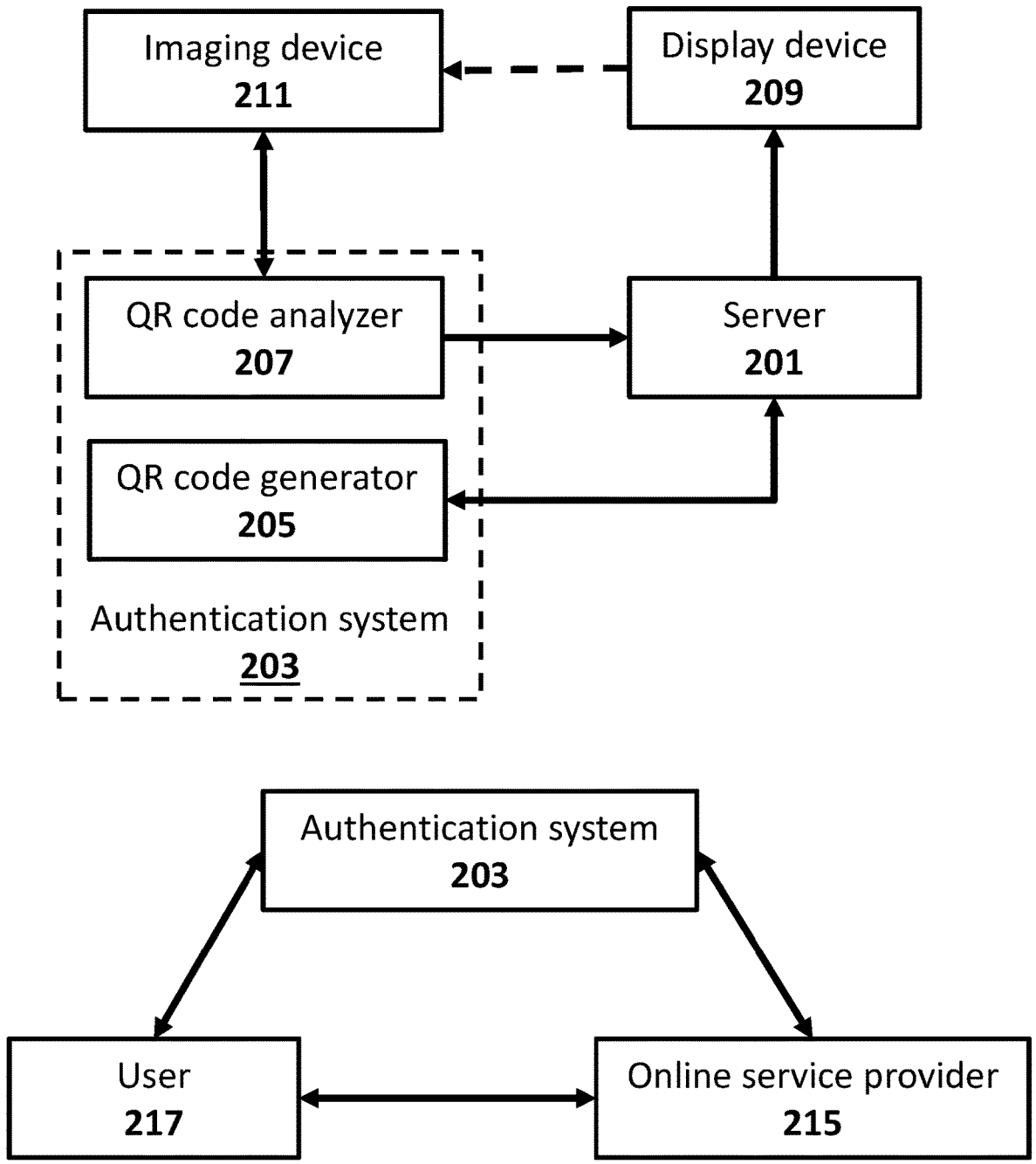
FIG. 2 shows a schematic diagram of users and online service providers using an authentication system to verify the identities of the users and/or the online service providers.

FIG. 2 shows a schematic diagram of users and online service providers using the authentication system to verify the identities of the users and/or the online service providers. A server 201, at the command of a user or an online service provider, may submit a QR code request to an authentication system 203. A server, as the term is used herein, may refer generally to a multi-user computer that provides a service (e.g. online transaction, database access, file transfer, remote access) or resources (e.g. file space) over a network connection. The server 201 may be provided or administered by an online service provider. In some cases, the server may be provided or administered by a third party entity in connection with a device provider. The one or more servers 201 may or may not be registered with the authentication system 203. In some instances, the server may include a web server, an enterprise server, or any other type of computer server, and can be computer-programmed to accept requests (e.g., HTTP, or other protocols that can initiate data transmission) from a computing device (e.g., a user device, a public share device) and to serve the computing device with requested data. In addition, the server can be a broadcasting facility, such as free-to-air, cable, satellite, and other broadcasting facility, for distributing data. The server may also be a server in a data network (e.g., a cloud computing network). In some embodiments, the online service provider 215 may administer one or more servers 201 to provide various services to the user 217, such as allowing users to create an online account with the online service provider.

The QR code request may be initiated when a user 217 initiates an account opening process. For example, when a user accesses a webpage portal provided by an online service provider 215 to open an account with the online service provider, such as by pressing a "register" or "sign up" button on a website of the online service provider, the online service provider may request a QR code from the authentication system 203. Alternatively, the user may directly request a QR code from the authentication system, such as by initiating the account opening process with a particular online service provider through an application and/or software provided by the authentication system or through a webpage portal or website hosted by a server of the authentication system. The user may access the webpage portal using, for example, the user device 104 and/or the display device 101 in FIG. 1. The server 201 may send the request to the authentication system for a QR code.

The authentication system 203 may generate a QR code associated with the request by the server 201 after verifying the identity of the online service provider 215. The request may contain an identity of the online service provider and a session ID. In some instances, the online service provider may have been previously registered with the authentication system and the verified identity of the online service provider may be stored in a database accessible to the authentication system (such as a database 312 of FIG. 3). Alternatively or in addition to verifying the identity, the authentication system may determine whether the QR code request came from a trusted source or entity. In some instances, the identity of the online service provider can be designated as a trusted source or entity by the authentication system, such as via domain address, registration certificate, or other forms of evidence. Upon determining that the request came from a verified online source provider and/or an online source provider which is a trusted source or entity, the authentication system may respond to the request by sending a unique QR code back to the requesting server. The server may then display the QR code on the webpage portal on a display device 209 so that the code can be displayed to the user 217.

When the authentication system 203 receives the QR code request from the server 201, a QR code generator 205 in the authentication system may generate a unique code along with a validation ID and a locator of the unique code. In some instances, the unique code may be a QR code in which the validation ID is encrypted. Generating a QR code may comprise at least three steps: (1) generating a unique validation ID, (2) encrypting the validation ID into an encrypted message, and (3) generating a one-time QR code encoding the encrypted message. The validation ID may be unique to each online account opening session. In some instances, the validation ID may be associated with a server identity, a service provider ID, a session ID, and/or a timestamp. The server identity and/or service provider ID may be known only to the authentication system. The session ID may be provided by the request from the server. In some instances, the timestamp may be in the format of 'yyyyMMddHHmmss' or any other suitable format if specified in the request. The validation ID can be used to identify the authentication (QR code) request in a unique manner. The validation ID or associated QR code may expire after a certain period of time or once they have been validated.

The validation ID may be encrypted by any suitable cryptographic techniques. The validation ID can comprise any format and data type. For example, symmetric-key algorithms may be used for encryption and decryption. The keys can be composed from a sentence or a series of non-meaningful characters, and encryption can be done by performing a bitwise XOR operation on data chunks (e.g., original data, structure data and Reed-Solomon data) that compose the QR code. The QR code may be generated by choosing a number of random locations in data and changing the bytes in these locations randomly. The Reed-Solomon algorithm can correct wrongly decrypted code words and form the correct message. The QR code can have any suitable storage capacity as long as it is capable of uniquely associating a QR code to a session. Any suitable visual graphical code may be used to represent the unique validation ID, such as a one-dimensional or two-dimensional code, images, and so on.

The generated QR code may be stored in a database accessible to the authentication system 203. The authentication system may retrieve the QR code from the database via the unique validation ID. Once the code is generated, a locator of the code may be provided to the server 201. In some instances, the locator can be a link or hyperlink associated with the code, such as a URL (uniform resource locator) to an IP (internet protocol) address or any other form of link that can enable a user using a browser to access the visual graphical code provided by a web server from the authentication system. Alternatively, the QR code may be sent directly to the server 201. The session ID may be provided to the online service provider along with the QR code or the locator such that the online service provider can link the code to the specific request.

The server 201 may or may not store a copy of the code. In some instances, the server may only store the locator, whereas the graphical image code can be stored in a database of the authentication system 203. Allocating the storage of the graphical image code to the database of the authentication system may beneficially ease the burden of the server 201 in terms of memory space. Once the QR code or locator is received, the server 201 may send the QR code or locator to a display device 209 configured to display the webpage portal of the online service provider 215. In some instances, the display device 209 in FIG. 2 may correspond to the device 101 in FIG. 1. As previously mentioned, in some instances, the display device 209 may or may not be registered with the authentication system 203. For example, the display device may be a publicly shared device. The display device 209 may be configured to be able to display an image such as a QR code. Optionally, the display device may prompt the user to scan the QR code via a message on the screen (e.g., "Please scan the QR code," "Please take a picture of the QR code," etc.).

A user 217 may use an imaging device 211 to scan the QR code displayed on the display device 209. In some instances, the imaging device 211 in FIG. 2 may correspond to the imaging device 103 in FIG. 1. In some instances, the user device (e.g., user device 104 in FIG. 1) may comprise the imaging device. The imaging device may be configured to capture an image of the QR code. Alternatively, the imaging device may be located on an external device such as an external camera sensor communicatively coupled (e.g., cables, wireless connection) to the user device. The captured visual graphical code may be transmitted to the user device via communication means such as cable or wireless connection. Optionally, the user device may comprise both the imaging device 211 and the display device 209, wherein the user may capture a QR code displayed on the display screen of the user device using an imaging mechanism (e.g., screen capture). The imaging device can be controlled by an application/software to scan a visual graphical code.

The captured visual graphical code can be transmitted from the user device (e.g., user device 104 in FIG. 1) to a QR code analyzer 207 in the authentication system 203 for analysis. In some instances, the QR code may be transmitted to the code analyzer via an application or software. The application or software may be provided by the authentication system 203 and run on the user device. In some instances, the image data of the QR code may be directly sent to the QR code analyzer (e.g., in image format). Alternatively, the application or software may process the captured code (e.g. decode the code or decrypt the decoded data) and send the processed information to the QR code analyzer for analysis. Optionally, the identity of the user device may be transmitted along with the code or processed information as a data packet to the authentication system 203.

The authentication system 203 may analyze the QR code for identification of the user 217 and/or verification of the online service provider 215. The QR code analyzer 207 may receive the code from the user device and decode the QR code and/or decrypt the decoded data. In some instances, the QR code analyzer may verify that the captured QR code is associated with a request from an authenticated online service provider, based on the validation ID encrypted in the code. Optionally, the QR code analyzer may provide the identity of the verified online service provider to the user to prevent fraudulent phishing attacks. For example, if the validation ID encrypted in a captured QR code does not match any record of a validation ID generated by the QR code generator 205 of the authentication system 203, then the lack of match can indicate a phishing attack. The authentication system may notify the user that the QR code is foreign to the authentication system, alerting the user of the possibility that the online service provider which provided the particular QR code to the user may be unverified and/or posing as an authenticated online service provider. In another example, if the validation ID is expired, wherein the authentication system determines that the validation ID has been previously validated by the user or another user or the validation ID contains a timestamp earlier than the timestamp in the stored copy of the QR code in the system database, then the expiration may indicate a replay attack. A user may be subject to a replay attack when an online service provider provides, or re-uses, an expired QR code without going through the authentication system (e.g., sending a new request for a code) and without the user's knowledge or approval. The authentication system may send a fraud alert to the user device, and prevent the user from proceeding with opening an account with the online service provider. In another example, the authentication system may determine that the validation ID is valid and that the identity of the online service provider is verified but that the online service provider is not registered as a trusted entity or source with the authentication system. The authentication system may send a warning to the user that the particular online service provider is not a trusted entity or source.

Alternatively or in addition, the QR code analyzer 207 may analyze the collected data packet to identify the user device and/or the user 217. The user device may be pre-registered as an authenticated device of the user with the authentication system 203 via an application or software provided by the authentication system. Alternatively, the user may manually register the user device by inputting and verifying a unique device identifier (e.g., IMEI code, serial number, etc.) to the authentication system and associating the user device with the user. The identity of the authenticated user device may comprise a unique user device ID which may be pre-existing with the user device (e.g., IMEI code, serial number, etc.) or generated by the authentication system and associated with the user device upon registration of the user device with the authentication system. The user device identity data may be stored in a database accessible by the authentication system. For each captured QR code, a user device may transmit the captured QR code data as well as user device identity data to the QR code analyzer. Subsequently, the authentication system may store the user device identity data as associated with the QR code in the system database for future user authentication and/or comparison with a stored user identity. For example, the authentication system may identify that a user device, and thereby the user, has already opened an online account with the online service provider that the user is presently attempting to register with. The authentication system may inform the online service provider that the user is creating a second, third, or $n^{th}$ account. An online service provider offering special services (e.g., discount codes) to first time registering users (e.g., customers) may beneficially avoid providing the special services to the repeating user. Similarly, an online service provider allowing only one online account per user may deny a user who has already created an account from creating a second account. Alternatively or in addition, the authentication system may inform, or remind, the user that the user has already created an online account with the online service provider. Optionally, the authentication system may provide the user with information regarding the pre-existing online account (e.g., username, email, etc.) to help the user access the pre-existing online account. In another example, the authentication system may inform the online service provider that the user is a verified user of the authentication system.

Once the authentication session is completed, the user and the online service provider may proceed with the account opening process, including requesting and receiving user information, which will be described in more detail further below.

FIG. 3 shows examples of user information data 300 that may be stored for each user and/or each user device. A user may be registered with the authentication system. For example, the user may be a registered user to an entity (e.g., a company, an organization, an individual, etc.) that provides, and/or administers, one or more authentication systems (such as the authentication system 203 of FIG. 2). Users may include any individuals or groups of individuals using software or applications provided by the authentication system. For example, the users may access a user device or a web account using an application programmable interface (API) provided by the authentication system. A user may be associated with one or more user devices. Alternatively or in addition, a user device may be associated with one or more users. In an example, if more than one user can be associated with a user device, the software or applications provided by the authentication system can require a user to identify the user by inputting user credentials (e.g., login username, password, PIN, fingerprint, etc.). In another example, if more than one user device can be associated with a user, a user may have a first user device (e.g., mobile phone) and a second user device (e.g., desktop computer)

associated with the user at any point in time. The users may be located geographically at a same location, such as users working in a same office or a same geographical location. In some instances, some or all of the users and user devices may be at remote geographical locations (e.g., different cities, countries, etc.), although this is not a limitation of the invention.

Upon registration with the authentication system, the user may be assigned a unique user ID (e.g., "UID 1" in FIG. 3). The user ID may be generated by the authentication system or provided by the user (e.g., username, login ID, nickname, email, etc.). The user ID may be in any format and can be stored in a database accessible to the authentication system (such as the database 512 in FIG. 5). The user may register one or more user devices as associated to the user in the authentication system. For example, if a user used a first user device (e.g., mobile phone, tablet, desktop computer) to register with the authentication system, such as by installing a dedicated software or application provided by the authentication system on the user device or creating a web account through the user device, the authentication system may automatically associate the first user device with the user. Alternatively, the authentication system may allow a user to decide to associate the first user device with the user. Optionally, the user may associate a user device or additional user devices with the user by manually inputting and verifying a unique device identifier (e.g., IMEI code, serial number, etc.) of the user device to the authentication system and associating the user device with the user.

Each user device may be assigned a unique user device ID (e.g., "UDID 1" in FIG. 3). The user device ID may be generated by the authentication system or be taken from the user device (e.g., IMEI code, serial number, etc.). The user device ID may be in any format and can be stored in a database accessible to the authentication system (such as the database 512 in FIG. 5). Each user device ID may be stored as associated with one or more user IDs in a database. Similarly, each user ID may be stored as associated with one or more user device IDs in a database. Association may be represented by rows in a database (as in FIG. 3), wherein the database comprises a column for a user ID and another column for a user device ID. Alternatively, association may be represented by columns in a database, wherein the database comprises a row for a user ID and another row for a user device ID. For example, in FIG. 3, each row represents associated data, wherein a first user ID, UID 1, is associated with a first user device ID, UDID 1, a second user ID, UID 2, is associated with a second user device ID, UDID 2, and so on. In another example, not shown in FIG. 3, a first user ID, UID 1, may be associated with two user device IDs, UDID 1 and UDID 2, in two separate rows with repeating user IDs. Alternatively, also not shown in FIG. 3, the database may comprise a column for a user ID, another column for a first user device ID, another column for a second user device ID, and so on, such that there is only one row for each user ID. Alternatively, if more than one user IDs are associated with one user device ID, the database may comprise a column for a user device ID, another column for a first user ID, another column for a second user ID, and so on, such that there is only one row for each user device ID.

The authentication system may collect user information data for each user ID and/or user device ID. The user information data may all be stored together in a single memory unit or may be distributed over multiple memory units. Data distributed over multiple memory units may or may not be simultaneously accessible or linked. Similarly, data can be distributed over multiple databases that may or may not be simultaneously accessible or linked. The data may include data collected for a single user for multiple user devices, for a single user for a single user device, or for a single user device for multiple users. Data from multiple users for a single user device may all be stored together or may be stored separately from one another. Data from multiple user devices for a single user may all be stored together or may be stored separately from one another. In some instances, all units of user information data collected for each user ID may be stored in a single row or a single column in a database. In other instances, all units of user information data collected for each user device ID may be stored in a single row or a single column in a database. Alternatively, different units of user information data may be stored in different databases. Alternatively or in addition, different user IDs and/or different user device IDs may be stored in different databases.

The user information data 300 collected by the authentication system can include any and all information that an online service provider could possibly request from a user when the user is opening an online account with the online service provider. Such information can include, for example, personal background information (e.g., first name, middle name, last name, previous names, present address, mailing address, previous addresses, primary phone number, secondary phone number, home phone number, mobile phone number, primary email address, secondary email address, social security number, birth date, title, high school, college, graduate school, highest education degree received, year of educational institution attendance, year diploma awarded, etc.), employment information (e.g., employer name, employer address, work email, work phone number, years of employment, reference name, reference phone number, reference email, etc.), financial information (e.g., credit card number, credit card expiration date, credit card security code, bank name, bank account number, routing number, Paypal® account username, annual or monthly income, amount of loans, etc.), online profile information (e.g., username, nickname, password, first security question & answer, second security question & answer, etc.), and sometimes copies (e.g., scanned copies, photographs, images, etc.) of physical documents (e.g., driver's license, transcript, bank statement, income statement, loan statement, education diploma, utility bill, etc.) among a myriad of other information that can be required from a user.

Each 'category' of user information data (e.g., first name, middle name, last name, birth date year, birth date month, birth date day, street address, state address state, city address, country address, address zip code, etc.) may be stored as a separate column (as in FIG. 3) in the database, wherein each row represents association of user information data (e.g., "UID 1" with "UDID 1" with "UI1-1" with "UI2-1" with "UIx-1" and so on in FIG. 3). Alternatively, each column can represent association of user information data and each category of user information data can be stored as a row. The category of user information data may be of any broadness (e.g., full name) or narrowness (e.g., first name, middle name, middle initial, last name) as can be required by an online service provider when a user requests to open an online account. One category may be a subset of another category. A parent category (e.g., mailing address) and a child category (e.g., zip code, street address, state, etc.) may each comprise separate columns, or rows, in the system database.

Upon registration with the authentication system, a user may be prompted to input user information data for selected categories, such as the categories listed above. In some instances, the authentication system may present a user with all the possible categories. A user may or may not input information for all the categories presented. For example, the authentication system may present the user with 1, 2, 3, 4, 5, 10, 20, 30, 50, 100, 200, 500 categories, or fields of user input, to populate and the user may decide to selectively input information for only certain categories. In making the selection, for example, the user may make an educated guess as to what type of information the online service providers that the user will likely want to create an online account with will require.

In some instances, the authentication system may group the categories, such as into simple personal background information, detailed personal background information, simple financial information, detailed financial information, simple employment information, detailed employment information, simple online profile information, detailed online profile information, and so on. Based on the type of online service providers a user is likely to create an online account with, the authentication system may include or exclude the groups of information categories. The user may provide the authentication system with the types of online service providers the user is likely to create an online account with (e.g., email service providers, game service providers, banking service providers, delivery service providers, etc.). For example, a user who has indicated that the user is not likely to create an online account with banking service providers (e.g., Bank of America®, Chase®, etc.), may not be asked to provide any type of financial information.

In some instances, the authentication system may request the user to provide online profile information (e.g., username, nickname, password, first security question & answer, second security question & answer, etc.) in anticipation of creating an online account. For example, the user may be asked to provide a preferred username, a preferred email ID, and a preferred password that the user would like to apply to future online accounts. The authentication system may prompt the user to input a username and/or a password that meets the requirements (e.g., at least one special character, at least 8 characters, less than 16 characters, at least one capital letter, etc.) of most online service providers. In another example, the authentication system may present the user with any number of commonly asked security questions (e.g., "What is your mother's maiden name?") in anticipation of an online service provider asking the question to a user when creating an online account. In another example, the authentication system may request that a user create a custom security question and a corresponding answer to the security question. In some instances, the authentication system may request the user to provide copies (e.g., scanned copies, photographs, images, etc.) of physical documents (e.g., driver's license, transcript, bank statement, income statement, loan statement, education diploma, utility bill, etc.). The user may provide such copies by uploading an electronic copy to the authentication system (or server), emailing an electronic copy to the authentication system (or server), mailing or faxing hard copies to an administrator of the authentication system who can translate the hard copy into an electronic copy, and so on. A user may decide not to provide select, or any, user information to the authentication system.

Each category of user information data may be associated with a user ID and/or user device ID of the user and stored in a database accessible to the authentication system. The system may retrieve user information data via a user ID and/or user device ID. The data may be encrypted before storage in the database for security.

An online service provider may be registered with the authentication system, in a similar manner to a user being registered with the authentication system. For example, the online service provider may be a registered user to an entity (e.g., a company, an organization, an individual, etc.) that provides, and/or administers, one or more authentication systems (such as the authentication system 203 of FIG. 2). An online service provider may be associated with one or more server identities, which was previously discussed. Alternatively or in addition, a server identity may be associated with one or more online service providers. In an example, if more than one online service providers can be associated with a server identity, the authentication system may request the online service provider to provide additional identifying information. In another example, if more than one server identities can be associated with an online service provider, an online service provider may have a first server identity and a second server identity associated with the online service provider at any point in time.

Upon registration with the authentication system, the online service provider may be assigned a unique service provider ID. The unique service provider ID may be generated by the authentication system or provided by the online service provider (e.g., domain address, etc.). The service provider ID may be in any format and can be stored in a database accessible to the authentication system (such as the database 512 in FIG. 5). The service provider database may be the same database as the one or more databases for user information (as in FIG. 3). Alternatively, the service provider database may be a different database. The online service provider may register one or more servers as associated to the online service provider in the authentication system.

Each server may be assigned a unique server identity. The server identity may be generated by the authentication system or be taken from characteristics of the server (e.g., server address, etc.). The server identity may be in any format and can be stored in a database accessible to the authentication system. Each server identity may be stored as associated with one or more server provider IDs in a database. Similarly, each service provider ID may be stored as associated with one or more server identities in a database. Association may be represented by rows in a database, wherein the database comprises a column for a service provider ID and another column for a server identity. Alternatively, association may be represented by columns in a database, wherein the database comprises a row for service provider ID and another row for server identity. In another example, a first service provider ID may be associated with two server identities in two separate rows with repeating service provider IDs. Alternatively, the database may comprise a column for a service provider ID, another column for a first server identity, another column for a second server identity, and so on, such that there is only one row for each service provider ID. Alternatively, if more than one service provider IDs are associated with one server identity, the database may comprise a column for a server identity, another column for a first service provider ID, another column for a second service provider ID, and so on, such that there is only one row for each server identity.

The authentication system may collect user information requirement data for each service provider ID and/or server identity. The user information data and the user information requirement data may all be stored together in a single memory unit or may be distributed over multiple memory units. Data distributed over multiple memory units may or may not be simultaneously accessible or linked. Similarly, data can be distributed over multiple databases that may or may not be simultaneously accessible or linked.

The user information requirement data may represent the categories of user information an online service provider requests from a user when the user is creating an online account with the online service provider. For example, an online service provider that is a banking service provider may request that a user wishing to create an online account provide information such as: first name, middle name, last name, address (e.g., street, apartment number, city, state, zip code), phone number, email address, social security number, birth date, annual income, choice of security question 1, answer to security question 1, choice of security question 2, answer to security question 2, choice of security question 3, answer to security question 3, username, and password. The user information requirement data for the online service provider may comprise all of the above listed categories. As can be seen from this example, user information requirement data for each service provider ID and/or server identity may comprise a selection of user information categories. In some instances, the authentication system may store the user information requirement data for an online service provider as a list, or a collection, of selected user information categories. Alternatively, the authentication system may store the user information requirement data for an online service provider as binary information (e.g., T/F, 0/1) for each category, which can save memory space.

The online service providers may provide the user information requirement data manually to the authentication system. Alternatively or in addition, the authentication system may, through pre-programmed instructions, extract the user information requirement data from the web portal or website of the online service providers (e.g., via analyzing source code) and automatically recognize certain user information categories. Different online service providers may label a user information category differently (e.g., "name" vs. "full name"; "resident address" vs. "mailing address" vs. "primary address" vs. "home address"; "mobile phone" vs. "primary phone" vs. "home phone" vs. "phone number" vs. "phone", etc.). The authentication system may consolidate different labels indicating the same user information category such as to ensure that the user information requirement data can match with existing user information categories. In some instances, the authentication system may consolidate labels by pre-programming synonyms, or frequently interchanging labels (e.g., "phone number" vs. "phone" vs. "phone no." vs. "home phone", etc.), to appear as one user information category.

Figure 4:
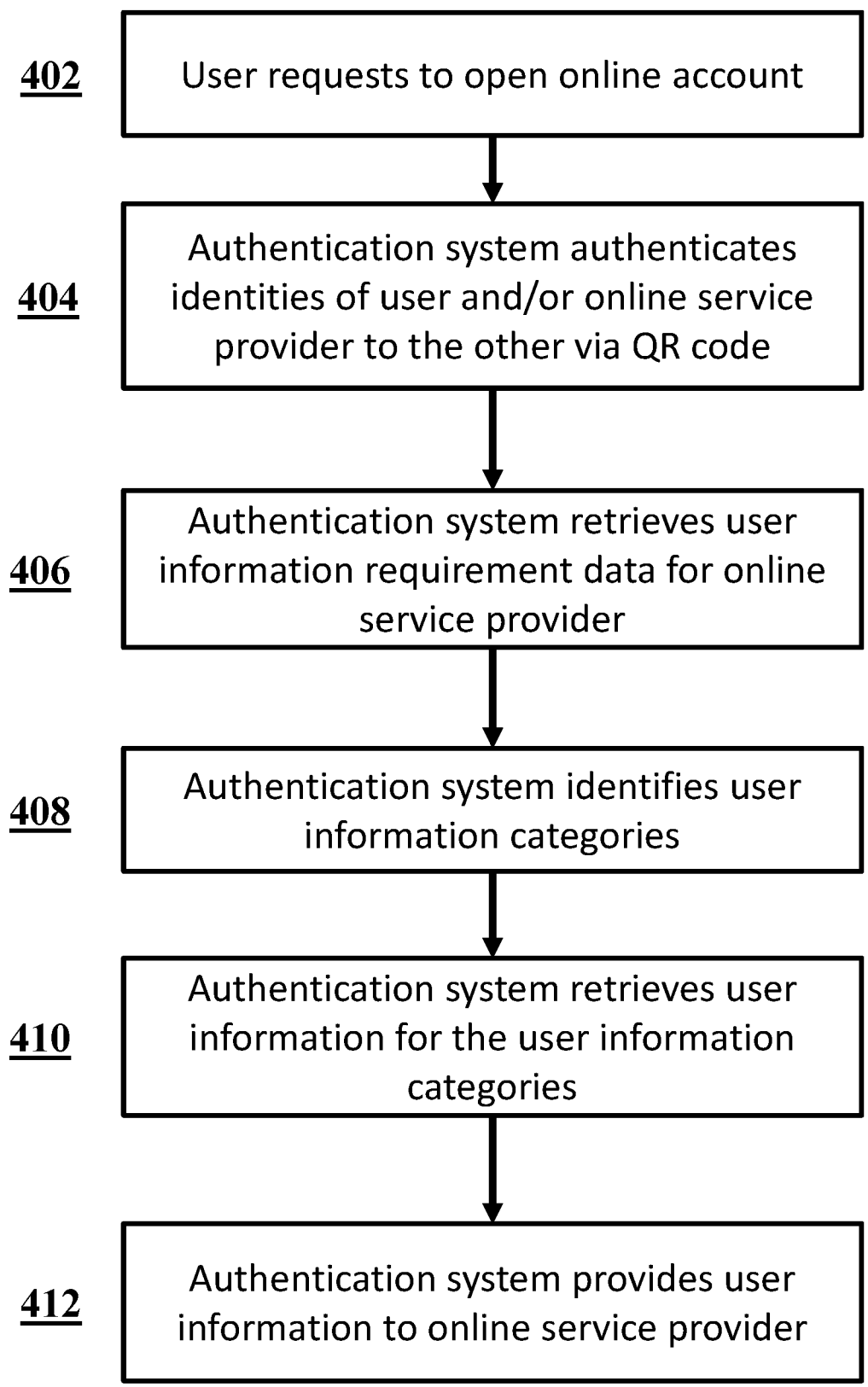
FIG. 4 shows a flow diagram of the authentication system providing user information to an online service provider.

FIG. 4 shows a flow diagram of the authentication system providing user information to an online service provider. Upon initiation by a user to create an online account 402 with an online service provider, and after the authentication system validates the identity of the user to the online service provider and/or the identity of the online service provider to the user such as by generating and analyzing a graphical code such as a QR code 404, the authentication system may retrieve from one or more databases the user information requirement data for the online service provider 406. Upon identifying the required user information categories from the user information requirement data for the online service provider 408, the authentication system may, next, retrieve user information for the selected categories 410 and provide the selected user information to the online service provider 412.

In some instances, the authentication system may provide the user information to the online service provider (such as through server 201 in FIG. 2) by automatically populating requested user information fields (e.g., populating the brackets in "First name: [Jane]"; "Last name: [Doe]"; "Address: [###Alphabet St, Alpha City, Beta State, Gamma Country, #####]"; "Birth date: [MM/DD/YYYY]"; "Phone number: [(###)###-####]"; "Social security number: [#########]", etc.). The user may be presented with the requested, and subsequently populated, user information fields, such as on a display device 209 in FIG. 2, to edit one or more units of user information as necessary before submitting the information to the online service provider. In some instances, if a user adds user information to a user information category that was previously unpopulated because the authentication system lacked user information for the user information category, the authentication system may collect and store the user information for the user information category for future use (e.g., for other online account opening sessions). In some instances, if a user edits user information for a user information category before submitting to the online service provider, the authentication system may collect and store the edited user information for the user information category and overwrite the pre-edit user information. The new or edited user information may be submitted to the authentication system directly to the authentication system or through the online service provider, such as through server 201 in FIG. 2. The user may be presented with an option to provide the new or edited user information to the authentication system or to prevent the authentication system from storing the new user information. Alternatively, the authentication system may automatically collect any and all new or edited user information without asking for user permission. The authentication system may associate the user information to a user ID and/or a user device ID based on the validation ID for the authentication session. Once the user submits the provided user information to the online service provider, such as through a user device 104 and/or display device 101 in FIG. 1, and the online service provider confirms receipt of the information without any error, the online account opening session can terminate.

Alternatively, the authentication system may submit the user information directly to the online service provider without presenting the user information to the user first, and the online service provider can confirm receipt of the user information, thereby completing the online account opening session. The authentication system may ask the user only for additional user information for which the authentication system lacks in its database.

In some instances, the authentication system may require a user to provide at least some online profile information (e.g., username, password) for each online account opening session. A user may beneficially secure the user's account from being breached by differentiating such information.

In some instances, before providing the user information to the online service provider, either in populating the user information fields or providing the user information to the online service provider directly, the authentication system may obtain permission from the user. Alternatively or in addition, the authentication system may allow a user to decide whether to preview the user information (e.g., as populated user information fields) or to provide the user information to the online service provider directly.

Figure 5:
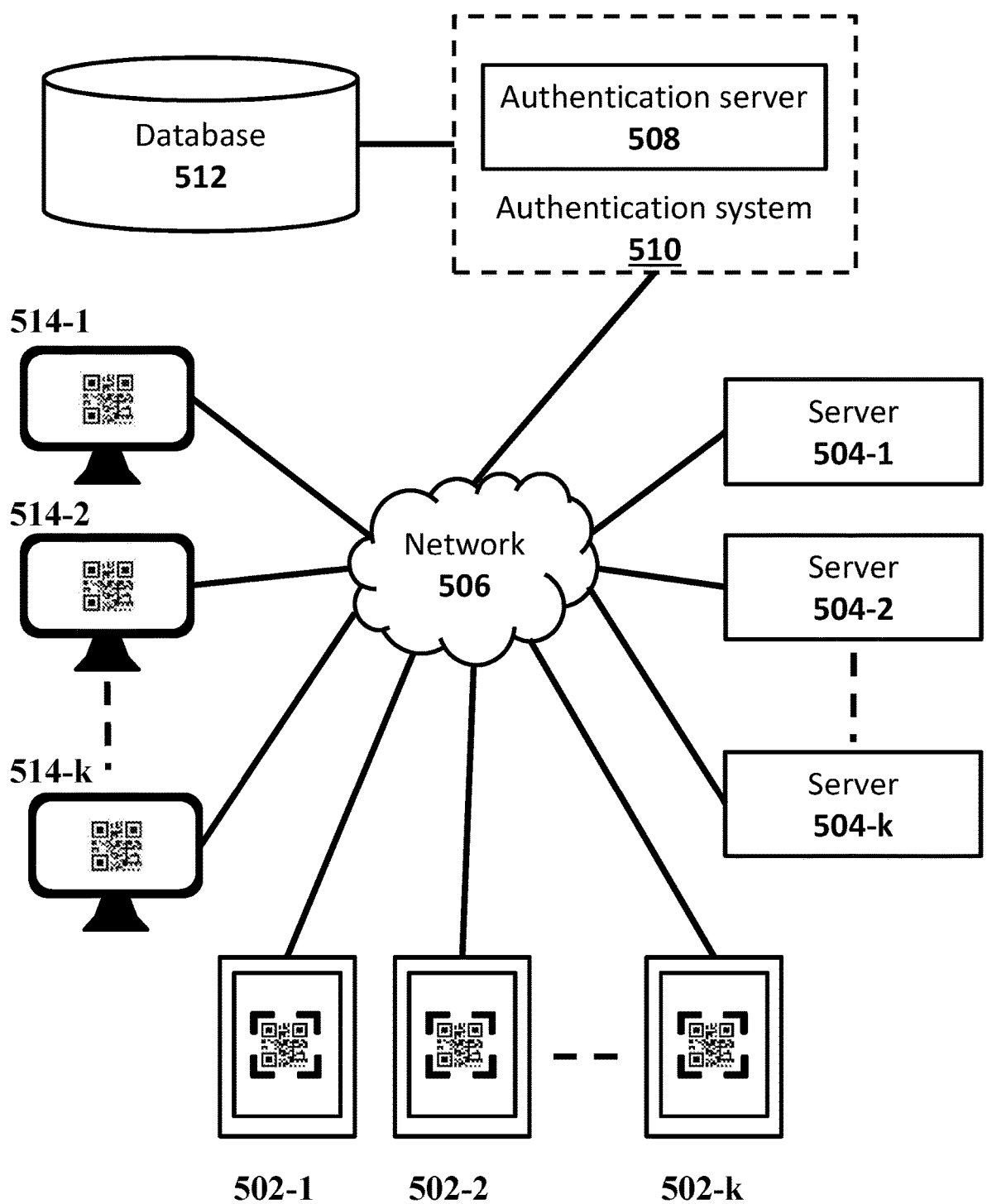
FIG. 5 shows an exemplary network layout comprising one or more authentication systems.

FIG. 5 illustrates an exemplary network layout comprising one or more authentication systems, in accordance with some embodiments. In one aspect, the network layout may include a plurality of user devices 502, one or more servers 504, a network 506, one or more databases 512, a plurality of display devices 514, a plurality of authentication servers 508, and one or more authentication systems 510. Each of the components 502, 504, 508, 510 and 514 may be operatively connected to one another via a network 506 or any other type of communication link that allows the transmission of data from one component to another.

A user device 502, as described previously herein, can be, for example, one or more computing devices configured to perform one or more operations consistent with the disclosed embodiments. For example, a user device may be a computing device that is capable of executing software or applications provided by the one or more authentication systems 510. In some embodiments, the software and/or applications may enable the user to scan a QR code or a visual graphical barcode displayed on another device, process the QR code or visual graphical barcode, and transmit authentication data between the user device and the authentication system during an authentication session. The software and/or application may have been registered with the authentication system by user. Optionally, the software and/or application may not be registered with the authentication system, and the user device can be registered with the authentication system. As such, the user may or may not be required to login to the user's account with the authentication system in order to proceed with the authentication session. In some embodiments, the application may be configured to collect authentication data (e.g., image capture, capture time, etc), and encrypt the data before sending them to the authentication server during an authentication session. The authentication session may be hosted by the server 504 on one or more interactive webpages, and accessed by one or more users.

As described previously, the user device 502 may comprise an imaging device such as a camera and/or an imaging software. The camera and/or imaging software may be configured to be able to capture a QR code or a visual graphical barcode.

In some instances, the network 506 may comprise a plurality of user devices 502. Each user device may be associated with one or more users. The one or more users may be located geographically at a same location, for example users working in a same office or a same geographical location. In some instances, some or all of the users and user devices may be at remote geographical locations (e.g., different cities, countries, etc.), although this is not a limitation of the invention.

The network layout may comprise a plurality of nodes. A node may be part of a telecommunications network. A node may receive and/or relay information. A node may generate information that may be relayed. Each user device 502 in the network may correspond to a node. In FIG. 5, if a "user device 502" is followed by a number or a letter, it means that the "user device 502" may correspond to a node sharing the same number or letter and other components corresponding to the node. For example, as shown in FIG. 5, user device 502-1 may correspond to node 1 which is associated with user 1, display device 514-1, and server 504-1; user device 502-2 may correspond to node 2 which is associated with user 2, display device 514-2, and server 504-2; and user device 502-$k$ may correspond to node k which is associated with user k, display device 514-$k$, and server 504-$k$, where k may be any positive integer.

A node may be a logically independent entity in the network layout. Therefore, the plurality of nodes in the network layout can represent different entities. For example, each node may be associated with a user, a group of users, or groups of users. For example, a node may correspond to an individual entity (e.g., an individual). In another example, a node may correspond to multiple entities (e.g., a group of individuals).

A user may be registered or associated with the authentication system. For example, the user may be a registered user of an entity (e.g., a company, an organization, an individual, etc.) that provides, and/or administers, one or more of authentication servers 508, databases 512, and/or authentication systems 510 for user authentication and user information provision consistent with certain disclosed embodiments. One user may be associated with one or more user devices 502. One online service provider may be associated with one or more servers 504. The disclosed embodiments are not limited to any specific relationships or affiliations between the users and the online service providers or servers 504, databases 512, authentication servers 508, and authentication systems 510.

A user device 502 may be configured to receive input from one or more users. A user may provide an input to a user device using an input device such as, for example, a keyboard, a mouse, a touch-screen panel, voice recognition and/or dictation software or any combination of the above. Examples of other user interactive devices may include a button, touchpad, joystick, trackball, camera, microphone, motion sensor, heat sensor, inertial sensor, or any other type of user interactive device. The input may include a user performing various virtual actions during an authentication session or before an authentication session. The input may include, for example, a user selecting an online service provider to open an online account with. The input may also include, for example, a user login to an account of the application provided by the authentication system or entering additional user information to complete an account opening session.

In the illustration of FIG. 5, two-way data transfer capability may be provided between any two components, including the authentication server 508 and each user device 502, the server 504 and each user device 502, the authentication server 508 and each server 504, the server 504 and each display device 514, etc.

An authentication server 508 may comprise one or more server computers configured to perform one or more operations consistent with disclosed embodiments. In one aspect, an authentication server may be implemented as a single computer through which a user device 502 is able to communicate with other components of the network 506. In some instances, a user device may communicate with the authentication server through the network. In other instances, the authentication server may communicate on behalf of a user device with the one or more authentication systems 510 or the database 512 through the network. In one aspect, the authentication server may embody the functionality of one or more authentication systems. In another aspect, the one or more authentication systems may be implemented inside and/or outside of the authentication server. For example, the one or more authentication systems may comprise software and/or hardware components included with the authentication server or remote from the authentication server. An authentication server may also be a server in a data network (e.g., a cloud computing network).

In some instances, a user device 502 may be directly connected to the authentication server 508 through a separate link (not shown in FIG. 5). In certain instances, the authentication server may be configured to operate as a front-end device configured to provide access to one or more authentication systems 510 consistent with certain disclosed embodiments. The authentication server may, in some instances, utilize the one or more authentication systems to process data provided by a user device (e.g., QR code image or image data) in order to compare and match the authentication data (e.g., timestamp, validation ID, etc.) and user information requirement data for authentication purposes and user information population purposes. The authentication server may be configured to store the authentication data, user information data for users, and user information requirement data for online service providers in one or more databases 512. The authentication server may also be configured to search, retrieve, and analyze (e.g., decrypt, decode, compare, etc.) authentication data stored in the one or more databases. The authentication server may also be configured to search, retrieve, and store user information data and user information requirement data in the one or more databases.

In some instances, a user device 502 may be directly connected to a server 504 of an online service provider to open an online account. In some instances, the server 504 in FIG. 5 may correspond to the server 201 in FIG. 2. In some instances, the server 504 may include a web server, an enterprise server, or any other type of computer server, and can be computer-programmed to accept requests (e.g., HTTP, or other protocols that can initiate data transmission) from a computing device (e.g., a user device, a public share device) and to provide the computing device with requested data. In addition, a server can be a broadcasting facility, such as free-to-air, cable, satellite, and other broadcasting facility, for distributing data. A server may also be a server in a data network (e.g., a cloud computing network).

A server 504 may comprise known computing components, such as one or more processors, one or more memory devices storing software instructions executed by the processor(s), and data. A server can have one or more processors and at least one memory for storing program instructions. The one or more processors can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), an MO (magneto-optical), a DVD-ROM (digital versatile disk-read only memory), a DVD RAM (digital versatile disk-random access memory), or a semiconductor memory. Alternatively, the methods disclosed herein can be implemented in hardware components or combinations of hardware and software such as, for example, ASICs (application specific integrated circuits), special purpose computers, or general purpose computers. While FIG. 5 illustrates the authentication server 508 as a single server, in some embodiments, multiple devices may implement the functionality associated with the authentication server.

The network 506 may be configured to provide communication between various components of the network layout depicted in FIG. 5. The network 506 may comprise one or more networks that connect devices and/or components in the network layout to allow communication between the devices and/or components. For example, the network may be implemented as the Internet, a wireless network, a wired network, a local area network (LAN), a Wide Area Network (WANs), Bluetooth, Near Field Communication (NFC), or any other type of network that provides communications between one or more components of the network layout. In some embodiments, the network may be implemented using cell and/or pager networks, satellite, licensed radio, or a combination of licensed and unlicensed radio. The network may be wireless, wired (e.g., Ethernet), or a combination thereof.

The one or more authentication systems 510 may be implemented as one or more computers storing instructions that, when executed by one or more processors, can generate a plurality of visual graphical codes (e.g. QR codes) upon request from a server 504 each of which is associated with a specific session (e.g., via validation ID, session ID, etc.), and provide the codes or locators of the codes to the server 504. Users may scan the codes through authenticated user devices 502 and transmit the scan data back to the one or more authentication systems. The one or more authentication systems may either, based on the codes and/or the scan data, provide user authentication to online service providers, and/or provide online service provider authentication to users for the purpose of one-sided or mutual authentication. Upon verification, the authentication system may provide user information of the user to the online service provider, either through the user or directly to the online service provider. In some instances, the server may comprise the computer in which the one or more authentication systems are implemented. Alternatively, the authentication server 508 may comprise the computer in which the one or more authentication systems are implemented. Alternatively, the one or more authentication system may be implemented on separate computers.

The server may access and execute the one or more authentication systems to perform one or more processes consistent with the disclosed embodiments. In certain configurations, the one or more authentication systems may be a software stored in memory accessible by the server (e.g., in a memory local to the server or remote memory accessible over a communication link, such as the network). Thus, in certain aspects, the one or more authentication systems may be implemented as one or more computers, as software stored on a memory device accessible by the server, or a combination thereof. For example, one authentication system may be a computer hardware executing one or more authentication techniques, and another authentication system may be software that, when executed by the server, performs one or more authentication techniques.

The one or more authentication systems can be used to authenticate users in a variety of different ways. For example, the one or more authentication systems may store and/or execute software that performs an algorithm for authenticating a user based on the QR code or a visual graphical code submitted by the user device in conjunction with authentication read data. The one or more authentication systems may also store and/or execute software that performs an algorithm for generating visual graphical codes (e.g. QR codes) having a specific validation ID. The one or more authentication systems may further store and/or execute software that performs an algorithm for searching, retrieving, and storing user information for users and user information requirement data for online service providers.

The disclosed embodiments may be configured to implement the one or more authentication systems such that a variety of algorithms may be performed to execute one or more authentication techniques and authentication sequences, including provision of required user information after an authentication is complete. Although a plurality of authentication systems have been described for performing the above algorithms, it should be noted that some or all of the algorithms may be performed using a single authentication system, consistent with disclosed embodiments.

The user devices 502, authentication server 508, service provider server 504, and the one or more authentication systems 510 may be connected or interconnected to one or more databases 512. The one or more databases may be one or more memory devices configured to store data (e.g., QR code, user identity, user device identity, service provider identity, server identity, transaction/validation ID, user information, user information requirement etc.). Additionally, the one or more databases may also, in some embodiments, be implemented as a computer system with a storage device. In one aspect, the one or more databases may be used by components of the network layout to perform one or more operations consistent with the disclosed embodiments. In certain embodiments, the one or more the databases may be co-located with the server, or co-located with the authentication server, and/or co-located with one another on the network. One of ordinary skill will recognize that the disclosed embodiments are not limited to the configuration and/or arrangement of the one or more databases.

A display device 512 may be an unauthenticated device in that the identity of the device is not, and need not necessarily be, registered with the authentication system. In some embodiments, the device is what the user uses to access a web portal or website provided by the server 504 to open an online account with an online service provider. The display device may be a publicly shared device whose identity is not known to the authentication system. As described previously, the display device may be configured to display a visual graphical code (e.g. QR code) and/or user interfaces (e.g., web portal, website) to the user. The visual graphical codes or locators of the codes may be transmitted to the display device from the server. In some embodiments, when a locator (e.g., URL) is provided, the QR code may be displayed via an interface such as a webpage or any software. The interface can be linked to the server via the locator (e.g., URL) to establish a communication between the user and the server. In other embodiments, the code encrypted in a validation ID may be directly transmitted to the display device and displayed to a user with or without an interface (e.g., webpage, web portal, software, etc.). The display device can be a computer (e.g., laptop computer, desktop computer), a mobile device (e.g., smartphone, tablet, pager, personal digital assistant (PDA)), a vending machine or the like requiring authentication or verification of the user to open an online account on the server (e.g., with an online service provider). The display device may optionally be portable. The display device may be handheld. The user device and the display device for any one node can be the same device. For example, user device 502-1 may be the same device as the display device 514-1, and the user device 502-2 may be the same devices as the display device 514-2.

Any of the user devices 502, the display devices 514, the servers 504, the one or more databases 512, and/or the one or more authentication systems 510 may, in some embodiments, be implemented as a computer system. Additionally, while the network is shown in FIG. 5 as a "central" point for communications between components of the network layout, the disclosed embodiments are not limited thereto. For example, one or more components of the network layout may be interconnected in a variety of ways, and may in some embodiments be directly connected to, co-located with, or remote from one another, as one of ordinary skill will appreciate. Additionally, while some disclosed embodiments may be implemented on the server, the disclosed embodiments are not so limited. For instance, in some embodiments, other devices (such as one or more user devices) may be configured to perform one or more of the processes and functionalities consistent with the disclosed embodiments, including embodiments described with respect to the server and the authentication system.

Although particular computing devices are illustrated and networks described, it is to be appreciated and understood that other computing devices and networks can be utilized without departing from the spirit and scope of the embodiments described herein. In addition, one or more components of the network layout may be interconnected in a variety of ways, and may in some embodiments be directly connected to, co-located with, or remote from one another, as one of ordinary skill will appreciate.

Figure 6:
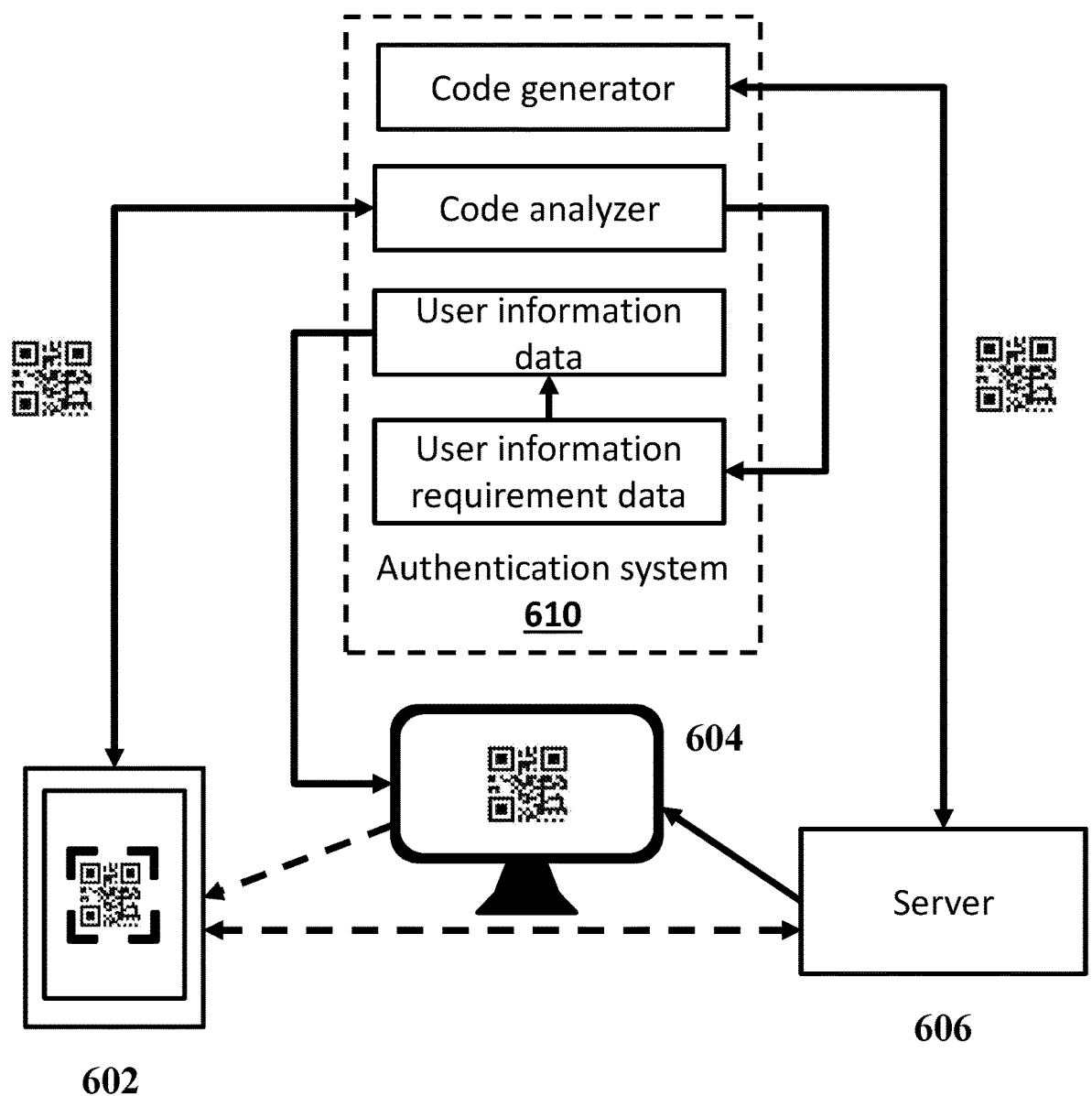
FIG. 6 shows a schematic block diagram of an exemplary system and method for opening an online account using a code.

FIG. 6 illustrates a schematic block diagram of an exemplary system and method for opening an online account using a code. In one aspect of the invention, an authentication system 610, server 606, and user device 602 can engage in a mutual authentication process that verifies the authenticity of both the user and the online service provider so that a user can ensure that the user is providing user information to a verified online service provider and the online service provider can ensure that the online service provider is opening an online account for a verified user. Alternatively, authentication can be one-sided such that either an online service provider is verified to a user or a user is verified to an online service provider. Servers 606 can be provided or administered by an online service provider. In some instances, the servers may be provided or administered by a third party entity. Both the online service provider and the user may have been previously registered with the authentication system 610. When the user is registered, the authentication system may create an account containing information about the user identity (ID) associated with the user, one or more user devices 602 (e.g., user device ID) associated with the user, and user information data (e.g., personal background information, financial information, etc.) associated with the user. Such user information data can be stored in one or more databases that are accessible by the authentication system. A user may or may not be required to login with the user's account through an application or software from a user device that may or may not be associated with the user in the authentication system, whereby the application is provided by the authentication system. In some embodiments, the authentication server (e.g., in one or more databases accessible by the authentication system) can maintain additional information such as QR code data (e.g., raw image, image data) submitted by the user device during an authentication session.

When a user initiates an online account opening process with an online service provider, the server 606 associated with the online service provider may send a request to the authentication system 610. The request may encode a server identity, service provider ID and/or a session ID. The authentication system 610 can decode the server identity, service provider ID and/or session ID in the request and generate a visual graphical code, such as a QR code, encoding a unique one-time identifier associated with the request. The unique one-time identifier may be a validation ID unique to the QR code which can be used for retrieving authenticating data. In some embodiments, the QR code can be an identifier intended for one-time use which expires upon first use or after a finite duration of time, or whichever event occurs first. Next, the authentication system can send the QR code or a locator (e.g., link, URL, etc.) of the QR code to the server 606 in response to the server request. The server can forward the code or the locator of the code to a display device 604 for display to the user. In some instances, the display device 604 may be an unauthenticated (e.g., unregistered) device with the authentication system. In some instances, the display device 604 may be the same device as a user device 602. In some instances, the display device may function as an interface for users to interact with the online service provider to open an online account (e.g., web browser or web portal that user can access to register or sign up an online account). The user may scan the code displayed on the display device using a user device 602, such as via an imaging device included in or otherwise communicatively coupled to the user device. The imaging device can be hardware and/or software. The user device can then send the scanned code or image data of the scanned code to a code analyzer in the authentication system to decrypt the code. In some embodiments, instead of the raw code image, the user device may process and/or analyze the code, such as decode the server identity and session ID, and transmit the decoded data to the authentication system. Once the code analyzer confirms that the validation ID of the received code uniquely matches a specific request by the server, the authentication system may notify to the user on the user device and/or the display device that the code is authentic, and that the online service provider is verified. In some instances, the authentication system may notify the user by sending a message. Alternatively, if the code analyzer determines that the code does not contain a valid validation ID or the validation ID has expired, the authentication system may notify the user that the code is invalid, and that the online service provider is foreign to the authentication system. Alternatively or in addition, the authentication system may warn the user of potential fraud in the process.

In some instances, along with the QR code or image data of the QR code, the identity of the user device (e.g., user device ID) and/or the user (e.g., user ID) may also be submitted to the authentication system. Subsequently, the authentication system may identify the user in the authentication system and locate the user information data associated with the user. From the server request and the validation ID, for example, the authentication system may also identify the online service provider and locate the user information requirement data associated with the online service provider. The user information requirement data may comprise one or more user information categories. From the online service provider's user information requirement data, the authentication system may identify the required user information categories and retrieve the selected categories of user information from the user's user information data. The authentication system may provide the user information data to the online service provider either directly or through the user device. For example, the authentication system can provide the user information to the user device and/or the display device for display to the user. The user may add, edit, or remove one or more user information fields before submitting the user information to the online service provider (through the server 606). If the authentication system lacks one or more categories of required user information (e.g., secondary email address, security question and corresponding answer, etc.), the user may be prompted to provide the one or more categories of required user information to the server and/or the authentication system. Once the server confirms receipt of all required user information for opening an online account, either having received directly from the authentication system or from the user through a user device and/or a display device, the server may open an online account for the user.

In some embodiments, the online account can be opened via a network between the user device 602 and the server 606 which bypasses the display device. The communications between the user device and authentication server, authentication server and service provider server, and user device and service provider server can be secured using various encryption techniques. Any combination of server certificates, secure sockets layer (SSL), secured protocol such as TLS (transport layer security) and/or internet protocol (IP) addresses can be used to secure the communications within the network.

Figure 7:
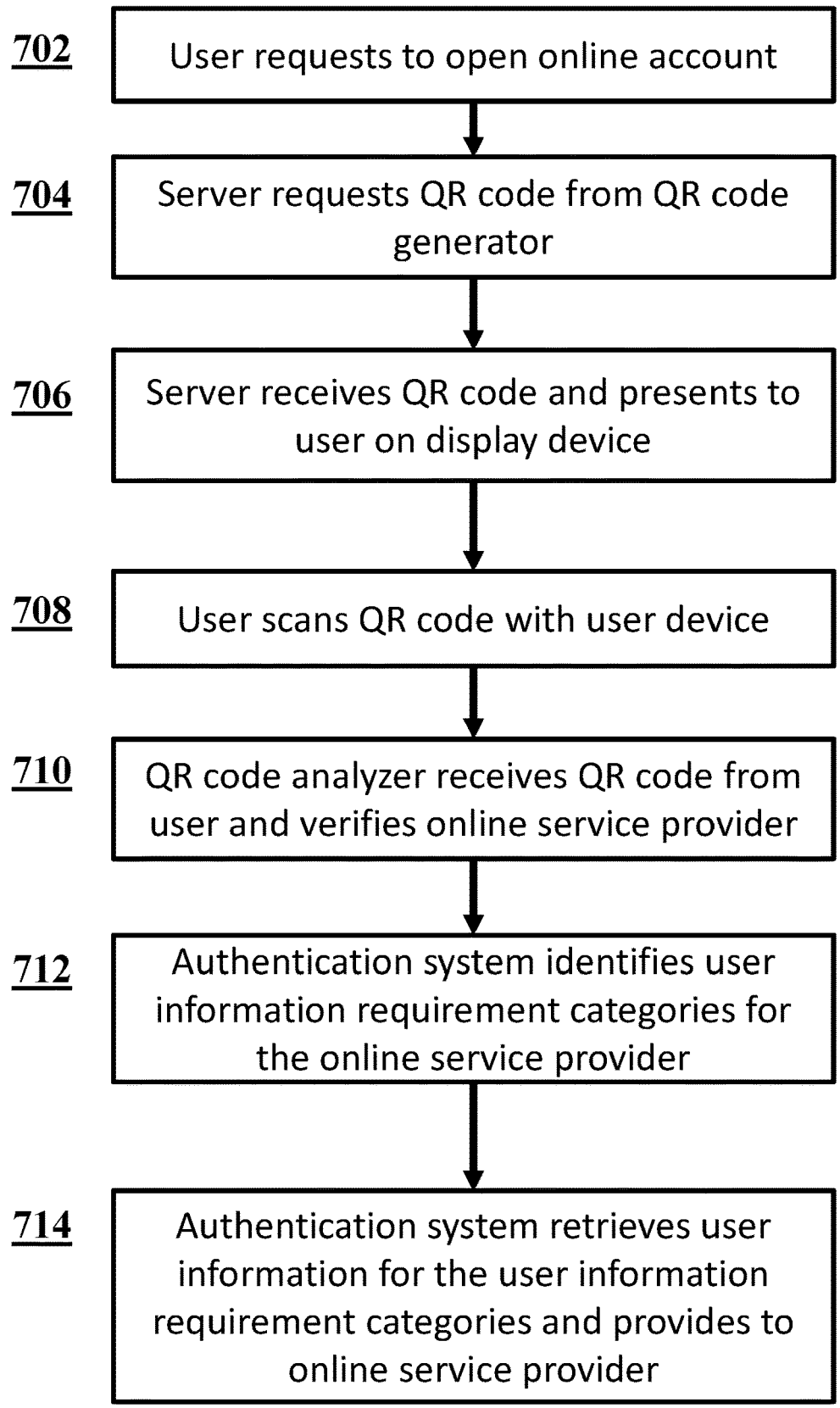
FIG. 7 shows a flow diagram of an overview of the online account opening process.

An overview of the online account opening process is shown in FIG. 7. The process begins when a user requests to open an online account with an online service provider through a server 702 associated with the online service provider. Upon the user request, the server requests a one-time code to a code generator 704 of the authentication system. In some embodiments, the code is a QR code. Upon receiving the server request, the code generator generates a one-time QR code encoding a validation ID containing the identity of the online service provider and/or the server identity. The server receives the QR code or a locator of the QR code, such as a link that can be used to retrieve the code stored in the authentication server, then displays the QR code to a user on a display device 706. The user scans the QR code with a user device 708, which may or may not be the same device as the display device, and transmits the code or processed data of the code to a QR code analyzer. The code analyzer may decode the validation ID from the code received from the user device and confirms the identity of the online service provider 710. If the service provider is authenticated, the authentication system locates the user information requirement data associated with the online service provider 712 and identifies the required user information categories for the user to open an online account with the online service provider. At step 710, the authentication system may further confirm the identity of the user such as via a user id or a user device id transmitted with the QR code. The authentication system may retrieve user information of the user for the user information requirement categories of the online service provider and provide the selected user information to the online service provider 714.

For all examples and figures depicting the use of a QR code, another form of graphical authentication indicia may be used in place of the QR code, such as another type of visual graphical barcode, images, pictures, or videos. The visual graphical barcode may be scanned by a user device which includes or is otherwise communicatively coupled to an imaging device.

The visual graphical barcode can be any format, such as a bar code, text, a picture, a sequence thereof, or the like that can be captured and/or displayed on a device. The visual graphical barcode may be a two-dimensional barcode, such as PDF417, Aztec, MaxiCode, and QR code, etc. The visual graphical barcode may be a one-dimensional barcode, such as Interleaved 2/5, Industrial 2/5, Code 39, Code 39 Extended, Codabar, Code 11, Code 128, Code 128 Extended, EAN/UCC 128, UPC-E, UPC-A, EAN-8, EAN-13, Code 93, Code 93 Extended, DataBar Omnidirectional (RSS-14), DataBar Truncated (RSS-14 Truncated), DataBar Limited (RSS Limited), DataBar Stacked, DataBar Expanded, and DataBar Expanded Stacked, etc. The visual graphical barcode can encode various types of information in any type of suitable format, such as binary, alphanumeric, ASCII, and other formats, and the code can be based on any standards. The visual graphical barcode may have various storage capacities that can encode a certain amount of data, and variable physical size. In some embodiments, the visual graphical barcode may conform to known standards that can be read by standard barcode readers. In other embodiments, the visual graphical barcode may be proprietary such that it can be read only by an authenticated application provided by an authentication system running on a user device. In some instances, only the authentication system or the authenticated application can be capable of encrypting/decrypting the visual graphical barcode.

The visual graphical barcode can be a one-dimensional barcode, two-dimensional barcode or three-dimensional barcode. The visual graphical barcode can be, for example, one-dimensional barcode that includes linear patterns such as lines and spaces. The lines and spaces may be black-and-white. The lines and spaces can comprise more than one color. The color may be visible to human eyes. The color of the barcode may be distinguishable by special tools. For instance, the barcode may include print carbon lines which are detectable using an infrared scanner. The visual graphical barcode can be a two-dimensional barcode including various shapes. The visual graphical barcode may be static or dynamic. The visual graphical barcode may be changed or updated at a certain frequency. The frequency may vary widely in range, such as from 100 Hz to 0.001 Hz.

In one aspect, additional security measures can be provided for the authentication session. The additional security measures may be resistant to replay attacks. In some instances, nonce data may be collected and used as anti-replay features. The nonce data may be generated when an imaging device is used to scan the visual graphical barcode.

In some instances, nonce data may be collected relating to a state of a scanned image of a visual graphical barcode or an imaging device during the first transaction. The nonce data may include one or more sets of singularity values (e.g., nonce factors) that may realistically only occur once, and would not naturally be repeated. Thus, repetition of the nonce data may be cause for suspicion that a replay attack may be occurring. The nonce data may relate to an internal state of the imaging device, the user device or component of the user device, or may include data that may be collected relating to a scanned image that contains the visual graphical barcode or the graphical authentication indicia. The nonce data may include image capture information such as metadata, positional information, or any other information relating to the imaging device. The nonce data may also include information generated during processing of the image for context analysis.

The nonce data can be generated at any phase during a transaction. For example, nonce data indicative of a state of a user device and/or an environment can be generated at the beginning of an authentication session, during scanning of a visual graphical barcode, and/or after transferring the barcode to the server. In another example, the nonce data may be indicative of a user behavior such as a touching activity on a touch-sensitive screen of the user device.

The nonce data can be generated during the scanning of the visual graphical code using an imaging device. The nonce data may be generated based on various parameters of the image containing the visual graphical code. The parameters may be obtained during pre-processing operations such as auto-adjustment of the raw image by the imaging device, such as by a camera (e.g., balance correction, gamma correction, de-mosaicing, de-speckle, etc). The parameters may be obtained during image processing operations in order to recognize a physical token and/or decode the token, such as image segmentation, edge detection, corner detection, pattern detection, measurement of image skew angle and rotation, measurement of pixel content, histograms, image scaling, smoothing, morphological filters, and etc. The nonce data can be obtained in the context of the whole image or a recognized region of interest. The nonce data may be generated based on a state of the imaging device, such as exposure settings, capture time, GPS location information, and camera model, etc.

Figure 8:
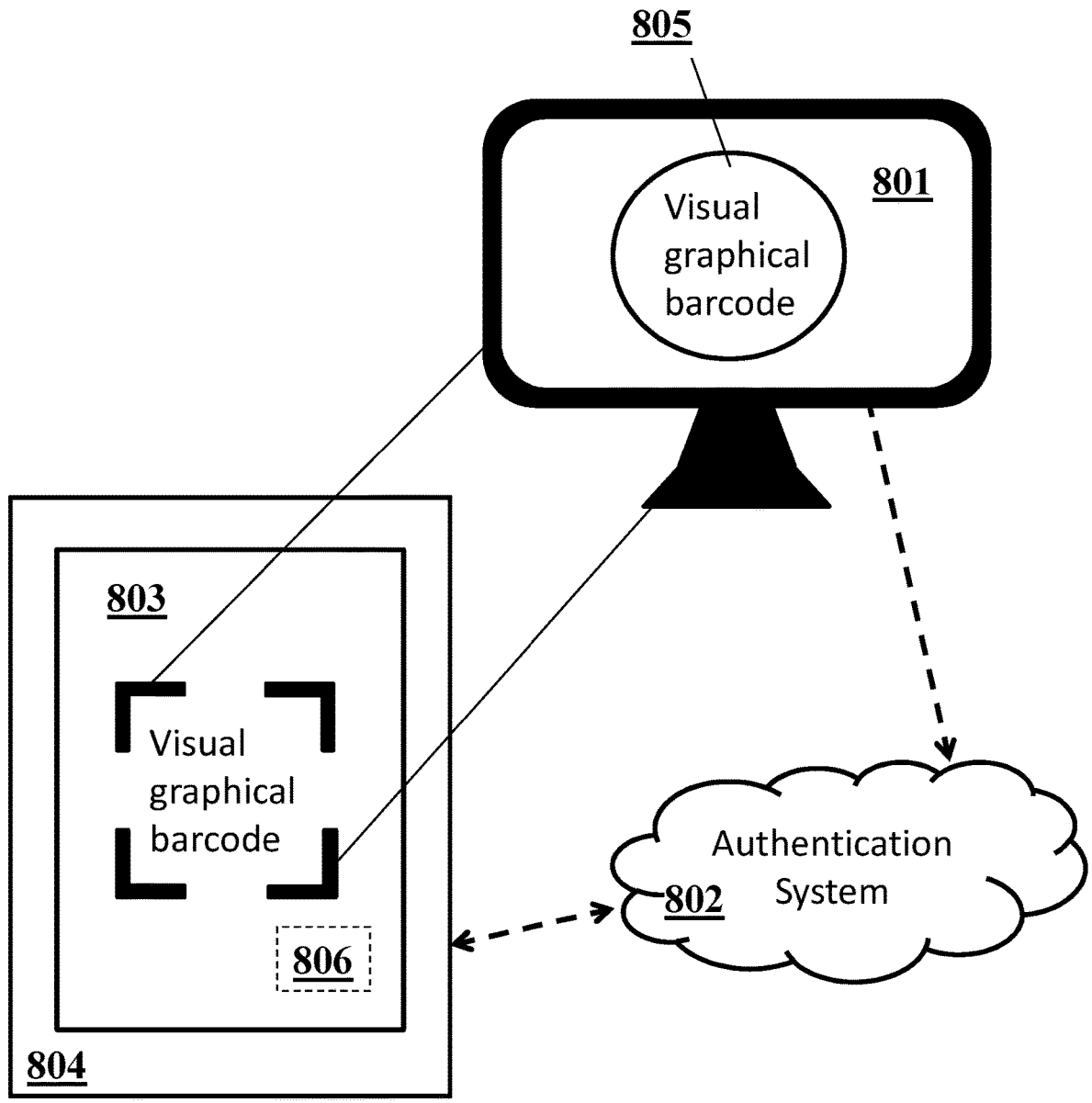
FIG. 8 shows a schematic illustration of a user device capturing a visual graphical barcode during an authentication session.

FIG. 8 shows a schematic illustration of a user device 804 capturing a visual graphical barcode in accordance with an authentication session. The authentication session may be hosted by a server (such as the server 201 of FIG. 2) on one or more interactive webpages, and accessed by one or more users. In some instances, the components, and functions and/or behaviors of the components, in FIG. 8 may correspond to the components, and the functions and/or behaviors of the components, in FIG. 1. In some instances, a component of FIG. 8 can be the same component of FIG. 1. For example, the user device 104 in FIG. 1 may correspond to the user device 804 in FIG. 8. For example, the imaging device 103 in FIG. 1 may correspond to the imaging device 803 in FIG. 8. For example, the display device 101 in FIG. 1 may correspond to the display device 801 in FIG. 8. For example, the authentication system 102 in FIG. 1 may correspond to the authentication system 802 in FIG. 8. All functions, capabilities, and connectivity of the components in FIG. 1 may apply to the components in FIG. 8.

The user device 804 can be used to scan a visual graphical barcode or graphical authentication indicia 805. The visual graphical barcode or graphical authentication indicia may be displayed on a display device 801. The user device 804 and the display device 801 may be separate devices or the same device. In some instances, the graphical authentication indicia may be provided on a physical object or be provided in the form of a physical object.

In some instances, a photo of the visual graphical code 805 may be acquired and stored on a memory unit of the user device 804 for further image processing and decoding. Alternatively, the imaging device 803 may scan the visual graphical code in real time without capturing a photo of the barcode. In some instances, the imaging device 803 may constantly acquire images of the visual graphical code and store them in memory. Each of these images can be subsequently processed by the user device until the visual graphical code is correctly decoded. Once the visual graphical code 805 has been decoded, the imaging device 803 may stop acquiring images of the visual graphical code.

In some instances, the user device 804 may comprise one or more sensors. The one or more sensors may be configured to collect data indicative of a state of the user device, a state of the imaging device and/or nonce data generated during a process. The one or more sensors may include, but are not limited to, location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones), time sensors (e.g., clocks), temperature sensors, sensors capable of detecting memory usage and/or processor usage, or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own source) and passive sensors (e.g., sensors that detect available energy).

Any number of sensors may be provided on-board the user device 804. The sensors may include different types of sensors, or the same types of sensors. The sensors and/or any other components described herein may be enclosed within a housing of the device, embedded in the housing of the device, or on an external portion of the housing of the device. The housing may or may not form a fluid-tight (e.g., water-tight or airtight) seal separating the interior of the housing and/or the exterior of the housing. Alternatively or in addition, the sensors may be external to the housing of the device and communicatively coupled, by cable or wirelessly, to the user device.

In some instances, the user device 804 may comprise a touch-sensitive touch screen 806. The touch-sensitive touch screen may provide an input interface and an output interface between the user device and a user. The touch screen may display visual output to the user. The visual output may include graphics, text, icons, video, and any combination thereof (collectively termed "graphics"). In some instances, some or all of the visual output may correspond to user-interface objects that instruct a user to, for example, confirm an online account opening process by touching a graphical button on the touch-sensitive touch screen. In some cases, a location of the touching may be recorded. The position of the touching on the touch screen (e.g., X, Y coordinates) may be used as nonce data.

In some instances, the visual graphical code 805 displayed on the display device 801 can be any type of graphical code as described previously herein. The visual graphical code may be referred to as a visual graphical barcode or graphical authentication indicia. In some instances, the visual graphical code may be a one-time visual graphical code. The visual graphical code may expire or time out after a certain period of time or once it has been validated. Alternatively, the visual graphical code may be presented to the user as a physical object. The visual graphical code may be on a physical element possessed by a user. The physical element may be a card (e.g., ID card, driver license, payment card, library card, login card, one time password (OTP) token, etc.), documents (e.g., passport, legal document, healthcare record, etc), and the like that are issued or provided by an entity or an online service provider. In other instances, the visual graphical code can be displayed on a display device as graphics.

As mentioned previously, nonce data may be used to provide an additional layer of security during an authentication session. Any description of nonce data may apply to various device measurements, indices, or parameters that may be unlikely to repeat. Nonce data may include or be derived from one or more nonce factors. The one or more nonce factors may include various types of data collected about a state of the user device, a state of the imaging device and/or a state of the captured image data. The nonce factors may include an activity performed by the user such as a touching on the touch screen. The nonce factors may include data from various sensors of the user device. The nonce factors may include various types of data collected about a state of the user device. The nonce factors may each be taken at a single point in time, multiple points in time, or over a time interval. Each of the nonce factors may be from different points in time, or may be from points in time that coincide and/or overlap. Each of the nonce factors may include data collected from different sensors or different types of sensors of the device. Alternatively, two or more of the nonce factors may be collected from the same sensor or same type of sensor. In some instances, all of the nonce factors may be collected from the same sensor or same type of sensor.

A state of the user device may include environmental information collected by the user device during an authentication session. The environmental information may include audio information collected by a microphone of the device. The environmental information may include information collected by a motion detector, an ultrasonic sensor, lidar, temperature sensor, pressure sensor, or any other type of sensor that may collect environmental information about the user device. The environmental information may include detecting the touch or a hand position of a user holding the device, and collecting which portions of the user device has been touched or held by the user.

Figure 9:
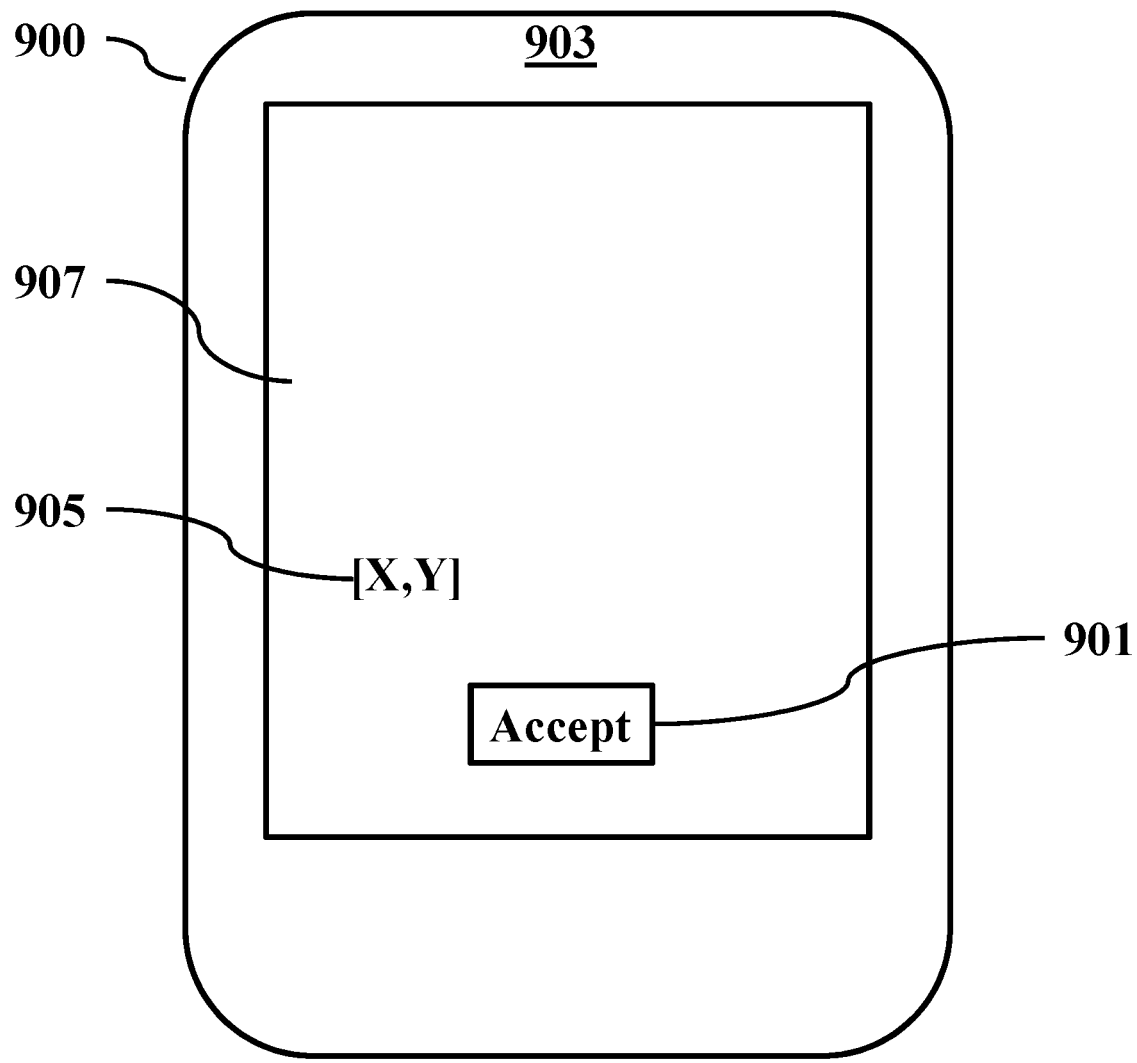
FIG. 9 illustrates an example of a user device collecting nonce data.

FIG. 9 illustrates an example of a user device collecting nonce data. A user device 900 may be used to open an online account through an external device (not shown in FIG. 9), such as a display device 801. A user may be prompted to scan a visual graphical barcode displayed on the external device using the user device. Once the user is verified, the user may be permitted to open an online account through the external device. The user device 900 can be the same user device 804 described in FIG. 8. The user device may comprise a touch-sensitive display screen 907. In some instances, the user device may further comprise microphones 903 for collecting audio data or any other sensor for collecting sensor data. The user device may be used to scan the visual graphical barcode, such as via an imaging device (e.g., camera). After a visual graphical barcode is scanned by the user device and verified by an authentication system (e.g., authentication system 802 in FIG. 8), the user may be prompted to click on a graphical object 901 (e.g., button, icon, etc.) on the user touch-sensitive display screen to continue the process. Alternatively, other types of nonce data such as data related to a state of the device can be used such that a user may not be required to click on the graphical object in order to continue the authentication process.

The graphical object 901 can be a visual representation of any graphical shape. It should be noted that various characteristics of graphical elements can be used as the visual representation such as color, shape, and image contents. A user may be prompted to click or touch the graphical object to verify that the user wants to proceed with opening an online account. For instance, a user may be provided a message (e.g., "Please click Accept to proceed.") to verify whether the user intends to open an online account by clicking or touching the graphical object (e.g., button shape graphical object). In some instances, the location or X and Y coordinates 905 of the location where the user touches the graphical object may be recorded and used as a nonce factor. The location where the user touches the screen is unlikely to be exactly identical every time. In some instances, an X and Y coordinates may be with respect to the touch-sensitive display screen 907. The X and Y coordinates may be with respect to a graphical element displayed on the screen such as the graphical object.

The nonce data may be transmitted to the authentication system by the user device 900. For example, the user device may transmit nonce data simultaneously with the scanned QR code data to the authentication system. Alternatively, the user device may transmit nonce data independently (e.g., at a different point in time) of the scanned QR code but along with a session ID to associate the nonce data with a particular authentication session. The nonce data may be stored as historic data in one or more databases (such as the database 512 in FIG. 5) accessible to the authentication system. The nonce data may be stored per authentication session, and retrieved and compared to new nonce data for each new authentication session. Alternatively or in addition, the nonce data may be stored per user device, and retrieved and compared to new nonce data for each new authentication session by the same user device. Alternatively or in addition, the nonce data may be stored per user, and retrieved and compared to new nonce data for each new authentication session by the same user. Alternatively or in addition, the nonce data may be stored per online service provider, and retrieved and compared to new nonce data for each new authentication session involving the same online service provider. Alternatively or in addition, the nonce data may be stored per service provider server, and retrieved and compared to new nonce data for each new authentication session by the same service provider server. The authentication system may complete the authentication session after verifying that the new nonce data is not a copy of historic nonce data, indicating a replay attack. The authentication system may proceed to provide user information to an online service provider only after verifying the nonce data.

In some instances, an authentication code may be provided to the user in addition to a visual graphical code, separate from the validation code that may be encoded in the visual graphical code. For example, if a user is tricked into scanning fraudulent or counterfeited visual graphical codes thereby unintentionally providing user information (e.g., user device ID, etc.) to a fraudulent source, it would be beneficial for the user to first verify the authenticity of the visual graphical code. The authentication code may be used to verify the authenticity of the visual graphical code. The authentication code may be, for example, an audio code that is played on an external device (such as the display device 801 in FIG. 8). The audio code may be generated by an authentication server (such as the authentication server 508 in FIG. 5), such as in step 704 of the process outlined in FIG. 7. The audio code may be uniquely associated with a visual graphical code. The audio code may be uniquely associated with a user device (e.g., user device ID) or user account (e.g., user ID). The external device that can play the audio code may be the same device that displays the visual graphical code. Alternatively, the external device may be communicatively coupled to the device that displays the visual graphical code. The external device may comprise a sound emitter configured to emit audio codes. The audio codes may be played simultaneously when a visual graphical code is displayed to a user for scanning. The audio codes may be collected by the microphones 903 of the user device 900 and the visual graphical code may be scanned by the imaging device of the user device. The user device may then transmit both the audio code and the visual graphical code to the authentication server for authentication. The authentication server may verify both the audio code and the visual graphical code. If the codes do not match, either with each other or with a stored copy of the respective code in the authentication system that generated the code, the lack of match may be indicative of a counterfeited visual graphical code.

The authentication code (e.g., audio code) and the nonce data can be used in combination or separately. In an example, an audio code may be verified first to identify the authenticity of the visual graphical code, and the nonce data may be verified next to detect any replay attack. The audio code and the nonce data may be used in any order or simultaneously. Using the audio code and/or the nonce data may provide an additional layer of security to the authentication session and beneficially protect against phishing or replay attacks.

In another aspect of the disclosure, a system or method for identity proofing and authenticating users is provided. The identity proofing and authenticating method may be compliant with, for example, the National Institute of Standards Technology (NIST) special publication 800-063-2(electronic authentication guideline), which is hereby incorporated by reference in its entirety. The method may be implemented using a system comprising computing devices that may communicate with each other via a network, and by way of one or more trust and security agreements between entities in the system that dictate how the entities are to interact with each other and/or that indicate which entities are liable for which occurrences in connection with interactions. The method may follow the guideline of NIST level of assurance (LOA) 1-4 and may further comprise features expanding upon it. For example, the method as described may provide three levels of identity proofing, three levels of authentication and/or an anti-replay feature.

The National Institute of Standards and Technology (NIST), has established various standards defining levels of trust for trusted identities. NIST refers to these standards as Level of Assurance or LOA. Several of these standards involve in-person identity proofing, lookup processes associated with government-issued identity cards, and several other forms of processes to ensure that the requesting party is proven to be who they claim to be before they can be issued a trusted identity.

As noted above, NIST refers to each standard level of trust as a Level of Assurance (LOA). NIST has established various numbers associated with the LOA depending on how rigorous a party desires the authentication process to be. These range from LOA 1, the weakest level of trusted identity, to LOA 4, the highest level of trust that a person possessing and using a trusted identity is authenticated as being the person to whom the trusted identity was issued. At LOA 1 although there is no identity proofing requirement at this level, the authentication mechanism provides some assurance that the same user who participated in previous transactions is accessing the protected transaction or data. It allows a wide range of available authentication technologies to be employed and permits the use of any of the token methods of LOAs 2, 3, or 4. Authentication of LOA 1 may be implemented by verification a user identity via a federated user account such as email address. An anti-replay feature may be included at LOA 1. For instance, when the user is asked to provide email address, nonce data may be collected by the user device when the information is sent out.

LOA 2 provides a single factor remote network authentication. At LOA 2, identity proofing requirements are introduced, requiring presentation of identifying materials or information. Identity proofing may be performed in various ways with various security levels. For instance, identity proofing may be performed at levels 'good', 'better' and 'best'. In an example, at level of 'good', identity proofing may use verified email address, by asking the user to provide data sent to the email account. This may not prove the identity per se, rather, establishes access to the internet handle that can be used later on. In an example, at level of 'better, identity proofing may use a remote scan of a government issued ID, such as driver license PDF 417 or Passport MRZ (machine readable zone). For additional confidence, a third party identity verification can be used. In an example, at level of 'best, identity proofing may conduct an in-person identity proofing, using a Passport NFC chip, to validate the document with high certainty. Details regarding the various confidence levels of identity proofing are discussed later herein.

LOA 3 provides multi-factor remote network authentication. At least two authentication factors are required. At this level, identity proofing procedures require verification of identifying materials and information. The identity proofing may be conducted remotely or online. LOA 3 authentication is based on proof of possession of the allowed types of tokens through a cryptographic protocol. The tokens may be different credentials used to authenticate a user. The credentials may or may not contain an identity of the user. Optionally the credentials may or may not contain attributes to the identity of the user. For example, the credential may contain verified name of the real user or pseudonyms. The credentials can be any form. The credentials may be electronic such as digital document that can be stored as data. The credentials can be secret information that the user knows such as user name and password. The same credentials may be used repeatedly for different authentication processes. The credentials may be generated later as needed such as QR code. The credentials may be a visual graphical barcode such as driver license PDF 417 as described elsewhere herein. In some cases, at LOA 3, the credentials may be mainly software based. Anti-replay features may be included at LOA 3 to eliminate risk of anti-replay attack.

LOA 4 authentication is based on proof of possession of a key through a cryptographic protocol. At this level, in-person identity proofing is required. LOA 4 is similar to LOA 3 except that only "hard" cryptographic tokens are allowed. The tokens may be physical object such as a physical token that can be possessed and controlled by a user (e.g., paper credential, card, finger print reader, card reader, etc). The token may be, for example a magnetic card possessed by the user. Use of the magnetic signature of a magnetic stripe accompanied by an anti-replay feature may provide a 100% guarantee of the validity of the authenticator. Anti-replay features can be in the authentication process at one or more of the LOAs. Anti-replay features may be included at LOA 4 to eliminate risk of anti-replay attack. For instance, nonce data may be collected at the user device when a magnetic card swipe is performed.

The identity proofing and authentication method further provides anti-replay features to add additional level of assurance. Various methods may be used to provide anti-replay protection. For example, nonce data relating to a device used to provide user credentials may be captured and used as anti-replay protection. The nonce data can be related to various factors, such as the device used for authentication or credential delivery, and the credential itself, etc. The nonce data may change with respect to time, geo location, motion, device status and any environmental factors. Ideally the nonce data should not be repeated that is a singularity. Having exactly the same nonce data may indicate a replay attack. The anti-replay feature can be generated at any time. For example, the anti-replay protection may be generated at the time a credential is provided by the user before transferring it to an authentication system.

Figure 10:
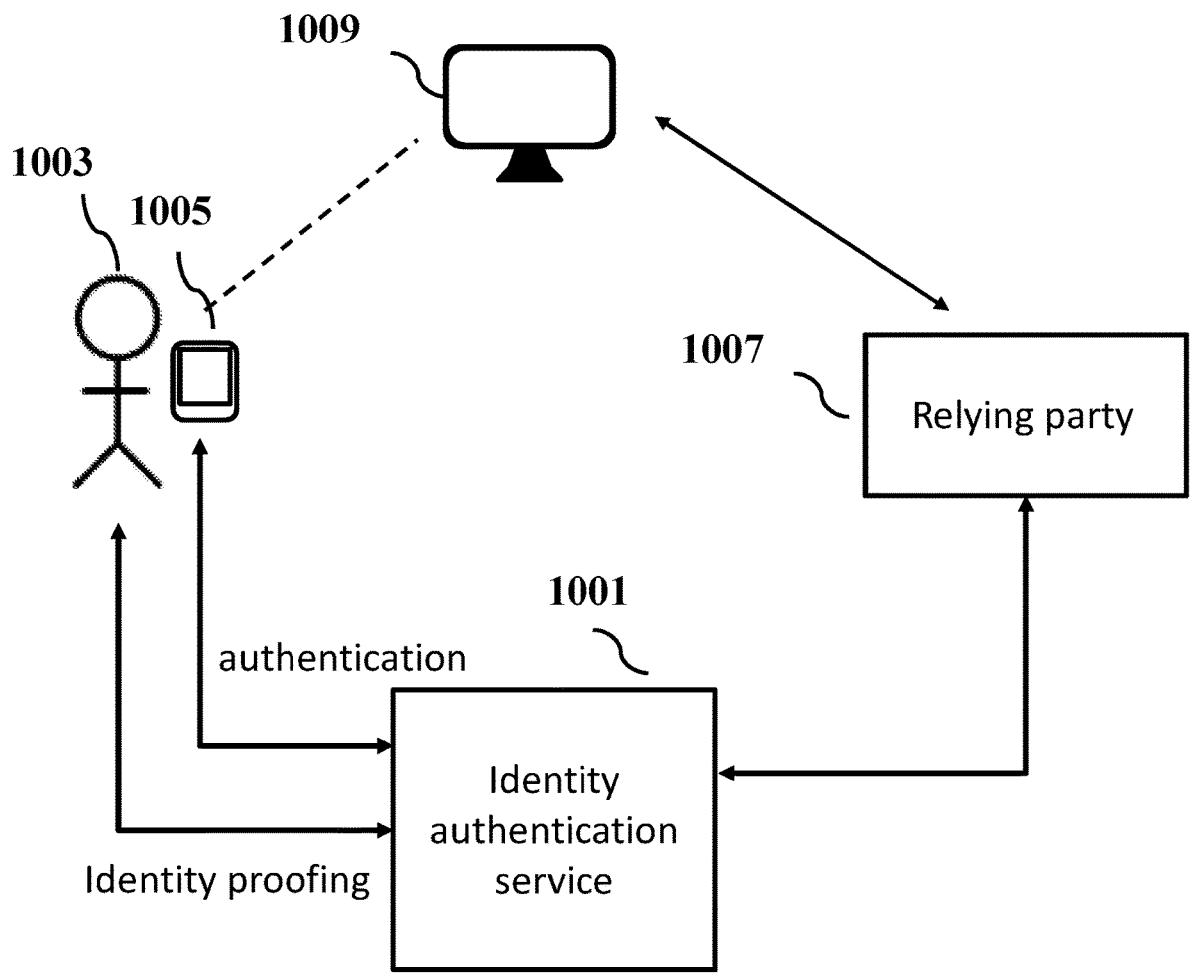
FIG. 10 schematically illustrates a system implementing the identity proofing and authentication method.

FIG. 10 schematically illustrates a system implementing an identity proofing and authentication method. The identity authentication services may be used to protect various activities requiring identity authentication. The activities may or may not include the exchange of money, goods, services, and/or information. The method or system may be used to grant access to sensitive and valuable assets. For example, access to high-value wire transfers, health records, privileged accounts, institutional banking, brokerage accounts, access to critical infrastructure (e.g., energy infrastructure, nuclear power plants) and remote or online access to mission-critical applications may be protected by the identity authentication method.

A user 1003 may perform an authentication for a user activity. In one example, the user may perform a transaction of exchanging money, goods, and/or services with a third-party entity or a relying party 1007. In another example, the user may purchase an item online from an e-commerce. In yet another example, the user may transfer money to a broker system. In another example, the user may login to a pre-registered user account on a social networking platform. In another example, the user may try to open an online account with an online service provider. In yet another example, the user may request access to a critical infrastructure or sensitive information. The user may perform the activity on a website or in an application associated with the third-party entity or the relying party.

The user may or may not log into a registered user account with the third-party entity (e.g., a public service, an online voting system, a social networking service, etc.) to perform the activity. In some cases, the user may try to open an online account with the third-party entity. The user may or may not register to the identity authentication service 1001 prior to the activity/transaction.

An identity of a user 1003 may be proofed. The identity proofing may be conducted at different identity assurance levels. In some cases, different identity documents or materials may be used to uniquely identify a user. The identity-proofing assurance level may be affected by different security levels of the identity documents and also affected by how the identity proofing document is presented and examined.

The documents may be physical documents such as a card, a paper document, or other form of credentials issued by an authority entity such as government, DMV, federal agency, etc. In some embodiments, the identity documents may be a person's civil credential such as social security card, passport, driver license, e-passport, birth certificates, employee identity cards, etc. Additionally, the identity documents used to establish identity of a user may also include records in a database, electronic identity information, etc. For example, Federal Tax ID may be used to establish identity of a company.

Different identity documents or materials may have different security levels. The security level may refer to various security features used by the identity document to prevent counterfeit. The identity documents can be authenticated in a variety of ways: signal, seal, special papers and inks, high quality engraving, holograms, cryptographic techniques etc that make the identity documents recognizable and difficult to copy or forge. A driver's license that is printed on a plastic card and has security features that are both overt and covert (e.g., ink visible only under black light, magnetic stripe) be a level higher than social security card. A passport that is printed on specialty paper and is bound in a booklet may have security features that are both overt and covert (e.g., ink visible only under black light, magnetic stripe). The special material and government printing may make a passport a level more secure than a driver's license. An E-passport that has a NFC/RFID chip embedded in it containing a person's identity information and is made in layers, which include government printing of the booklet and state department issue of the chip and its cryptographic seal, may make the E-passport a high level of security.

Different ways an identity document is presented or examined may have different trust or confidence level. An identity document may be presented in different ways. The different ways may be in-person proofing, remote proofing or online proofing, etc. In some cases, the different ways may be categorized into multiple levels. For example, identity proofing may be divided into levels including Know, Show, Present and Prove. Different levels of identity proofing may be associated with different difficulty levels to falsify or different levels of in-person participation of the user. Taking a U.S. passport with NFC chip as example, at a level of 'Know', a user may prove that he is who he claims to be by showing he knows information of the passport such as the passport number. The person may present his knowledge of the passport by various means such as entering the information by typing it on a website via a user device, say the information over the phone or in person. The information provided by the person may be sufficient to establish a unique identity of the user as stated by the identity proofing document. At the level of 'Show', the user may show the passport remotely via any suitable means. For example, the user may scan the passport using a camera on a mobile or any PC device then transfer the electronic copy of the passport (e.g., captured image) including required information such as MRZ (machine readable zone) information. The transfer method may involve any suitable device such as mobile device and desktop via any suitable communication means such as on-line. The transfer method may or may not use cryptographic techniques. The user may present information that may be attainable from the identity document. Optimally, the user may present information that may only be known if the user has the identity document or one had the identity document in the user's possession. At the level of 'Present', the user may present the passport in-person to an authorized agent or authorized entity. The authorized agent or entity may have certain expertise such as the ability to recognize and verify a picture ID card and/or the capability of use a specialized infrastructure to extract the identity information. For example, an optical device may be provided to the authorized agent or entity for inspecting the passport by reading an image of the MRZ in order to extract the identity information of the user. At the level of 'Prove', the user may present the passport in-person to an authorized agent or entity. The authorized agent or entity may be equipped with specialized infrastructure or technology to prove the authentication of the identity document. For example, the authorized agent or entity may be equipped with specialized devices (e.g., MRZ reader, optical reader or scanner, magnetic reader) to inspect one or more security features of the physical identity document as described previously to identity whether the identity document is a counterfeit. In some cases, during the different presentation processes (e.g., Know, Show, Present and Prove), one or more factors associated with inspecting or authenticating the identity document may be automatically recorded. For example, when a user presents a passport in-person to an authorized agent, one or more factors (e.g., 'Prove' level, presentation location, relationship between the user and the agent, etc) related to the identity document and presentation processes may be automatically recorded in a database accessible by the system. In some cases, a device may be used to authenticate or inspect an identity document and the device may transmit wired or wireless communication the identity information captured or identified by the device to one or more processors for analysis. The device may be an optical device, a scanner, a magnetic stripe reader, etc. Data transmission can be realized by any feasible means such as wired or wireless communication.

In some embodiments, the first level of identity proofing assurance may not require an identity proofing document. A user may be asked to provide a federated account such as an email account to establish an access to services provided by the identity authentication service system 1001. The federated account may be used as a single authenticated service account that can be re-used across multiple online services. The user account may be used to establish a connection of the user to various relying parties in a federated manner. Various other accounts can be employed such as social network account, email address and the like. The federated account may be provided as a user identifier for uniquely identifying a user by a relying party meanwhile providing a communication or verification channel between the user and the relying party/identity authentication service system. In some embodiments, the second level of identity proofing may require one or more identity proofing documents or third party record, such as a driver license or a passport or a healthcare record to be inspected remotely, such as a remote scan. In some embodiments, the third level of identity proofing may require an in-person identity proofing to inspect one or more identity proofing documents with the high security level, such as a passport with NFC chip. In some cases, at all levels, a federated user account such as the email account may be required.

In some embodiments, the users 1003 may provide their identity or an email address to the identity authentication service 1001 when they register to the identity authentication service system. The identity authentication service system may perform identity proofing of the user by requiring identity proofing document via certain presentation means. Once the identity of the user is proved, the identity authentication service 1001 may or may not issue one or more credentials to the users. The credentials can be used for later authentications. In some cases, once the identity of the user is proved, an access to the authentication services provided by the identity authentication service system may be established. For instance, the user may be allowed to use barcode scanning functions provided by a mobile application running on the identity authentication server. Different credentials may be used to authenticate a user. The credentials may or may not contain an identity of the user. Optionally the credentials may or may not contain attributes to the identity of the user. For example, the credential may contain verified name of the real user or pseudonyms. The credentials can be any form. The credentials may be physical object such as a physical token that can be possessed and controlled by a user (e.g., paper credential, card, finger print reader, card reader, etc). The credentials may be electronic such as digital document that can be stored as data. The credentials can be secret information that the user knows such as user name and password. The same credentials may be used repeatedly for different authentication processes. Different credentials may be used for different authentication processes. The credentials may be generated later as needed such as a QR code.

As mentioned previously, the identity authentication service 1001 may provide authentication services at different levels of assurance. In some embodiments, the first level may be a two-factor authentication. The first level of authentication may require something you know (e.g., PIN) and/or something you are (e.g. biometrics). For instance, a user may be asked to input a PIN or provide a fingerprint via a user device. In some cases, anti-replay features may be provided along with the credentials. In some embodiments, the second level may include an additional factor relative to the first level. In some cases, the additional factor may be scanning of a visual barcode or an identity proofing document (e.g., PDF 417 on a driver license). This additional factor may be something you have. In some embodiments, the third level may include use of a physical token such as a magnetic card to provide additional security relative to the second level. In some embodiments, some or all of the authentications are performed via a mobile application running on the user device 1005. In some cases, the user device 1005 may be pre-registered with the identity authentication service system and have a unique device ID stored in a database that is accessible by the identity authentication service system.

The one or more users may try to gain access to one or more relying-party entities 1007. A relying party (RP), e.g., the web site storing resources being accessed by the second site, sets a policy that allows a requester (e.g., a user, another RP, the third party web site accessing the secured resources) access to a resource controlled by the RP based on a set of authenticated user attributes (e.g., username, address, age, and the like). The resource to be accessed may be, for instance, protected data, a particular computing device, an account, a transaction, or a computing function. The relying party may include, but are not limited to, a merchant's system, a broker's system, a credit card company, a social network platform, a government department, a critical infrastructure, and/or other entities that may require user authentication. The relying party may be configured to offer various services to the user which may or may not include exchange of money and/or goods. The services may include any situation where authentication may be required using one or more credentials as discussed elsewhere herein. The services may be performed completely online (e.g., online shopping, online social networking, online registration and/or fee payments). The services may be performed completely in physical locations (e.g., shopping at a supermarket, backing services at a bank, registration at the city hall, etc.). The services may also include partially online activities in combination with partially physical activities. For a user to access the RP-protected resource, an identity authentication service 1001 that is acceptable to the relying party will authenticate the user identity using one or more credentials, and the identity authentication service 1001 will provide the verified user identity or approved user identifier to the relying party.

The relying parties 1007 may be implemented on one or more standalone data processing apparatuses or a distributed network of computers. The one or more relying parties may comprise one or more RP servers. In some cases, one or more RP servers may be implemented in software, hardware or a combination of both. The RP servers may be, for example, banking website, government service website, social networking websites, automated banking machines, point of sale machines, virtual private network systems, healthcare system, or other enterprise servers.

In some cases, the one or more users may access services provided by the one or more relying-parties via one or more accessing devices 1009. A user may access information or services provided by the RP via a client interface, such as a browser executing on the accessing device or a browser executing on the user device. In some cases, the user may try to register or open a new account with the relying-party. The accessing device 1009 can be a monitor, a computer (e.g., laptop computer, desktop computer), a mobile device (e.g., smartphone, tablet, pager, personal digital assistant (PDA)), or a vending machine. In some instances, the accessing device may comprise one or more processors natively embedded in the accessing device. The accessing device may optionally be portable. The accessing device may be handheld. In some embodiments, the accessing device can be the same display device as described in FIG. 1.

The identity authentication service 1001 may include authorized agent who is capable to authenticate identity proofing document in-person or remotely. The identity authentication service may also include or have access to one or more databases for storing various information obtained during user registration process and features engaged in an authentication processes. The various information may include but not limited to, user identity information, federated account, identity proofing document information, authentication or presentation methods, user provided information associated with their account (e.g., challenge questions, username, password), information regarding credentials issued to the user such as pre-registered card information (e.g., encoded data, magnetic fingerprint data, and/or swipe characteristics) of one or more cards of the user associated with a card reader, pre-registered account information of the user associated with the card reader, pre-registered device information of the user device (s) which may have interactions with the card reader, pre-registered device identifier of the card reader, historic authentication reads data using the card reader, registration data registered using the card reader, and various other factors collected during the identity proofing process (e.g., location, time, public notary) and various features of the credentials. The databases may also store information regarding various features of the authentication processes.

The identity authentication service 1001 may be configured to perform various authentications as required by various activities as discussed elsewhere herein. The various authentications may include verifying user credentials with or without anti-replay features. The various functionalities of the identity authentication service may be facilitated by use of one or more processors. The identity authentication service may be facilitated by and/or have access to one or more databases. The identity authentication service may be implemented on one or more standalone data processing apparatuses. Alternatively, the identity authentication service may be implemented on one or more processing apparatuses and/or databases offered by a distributed network of computers (e.g., peer-to-peer or cloud-computing based infrastructure). One or more functionalities of the identity authentication service may be part of a server or accessed by a server.

The identity authentication service may be in communication with one or more user devices and/or one or more user credentials 1005. The authentication service may be in communication with various user devices and/or user credentials with aid of a communication unit (e.g., an I/O interface). The identity authentication service may be in communication with various external server systems (e.g., merchant's system, broker's system, credit card companies, social network platforms, and/or other entities). The identity authentication service may be in communication with various external server systems with aid of one or more I/O interfaces. The I/O interface to the user devices and/or the user credentials may facilitate the processing of input and output associated with the user devices and/or the card readers respectively. For example, the I/O interface may facilitate the processing of a user input associated with a request for secure authentication. The I/O interface to external server systems may facilitate communications with one or more third-party entities (e.g., merchant's system, broker's system, credit card companies, social network platforms, and/or other third-party entities).

The user devices, accessing devices, RP servers or identity authentication servers may communication with each other via one or more communication networks. The communication network(s) may include local area networks (LAN) or wide area networks (WAN), such as the Internet. The communication network(s) may comprise telecommunication network(s) including transmitters, receivers, and various communication channels (e.g., routers) for routing messages in-between. The communication network(s) may be implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), WiMAX, or any other suitable communication protocols.

In some instances, one or more user devices 1005 may be in communication with the identity authentication service with respective credentials. In some instances, a user device may be a user credential. The user device may be used to scan a visual barcode displayed on the accessing device 1009 for authenticating the user. The user device may be a computing device that is capable of executing software or applications provided by one or more identity authentication service systems. In some embodiments, the software and/or applications may allow the user to scan a visual graphical barcode such as a QR code displayed on another device, and transmit authentication data between the user device and identity authentication service system during an authentication session. The software and/or application may have been registered with the identity authentication service system by the user. Optionally, the software and/or application need not be registered with the identity authentication service system, and only the user device may be registered with the authentication system. Thus the device may have a device ID stored in a memory accessible by the identity authentication system. In some embodiments, the software and/or application may be configured to control an external device such as a card reader to collect authentication data (e.g., swipe characteristics data, magnetic fingerprint data, positional data, etc), and encrypt the data before sending them to the identity authentication server during an authentication session. In some embodiments, a visual graphical barcode based authentication method is provided.

Figure 11:
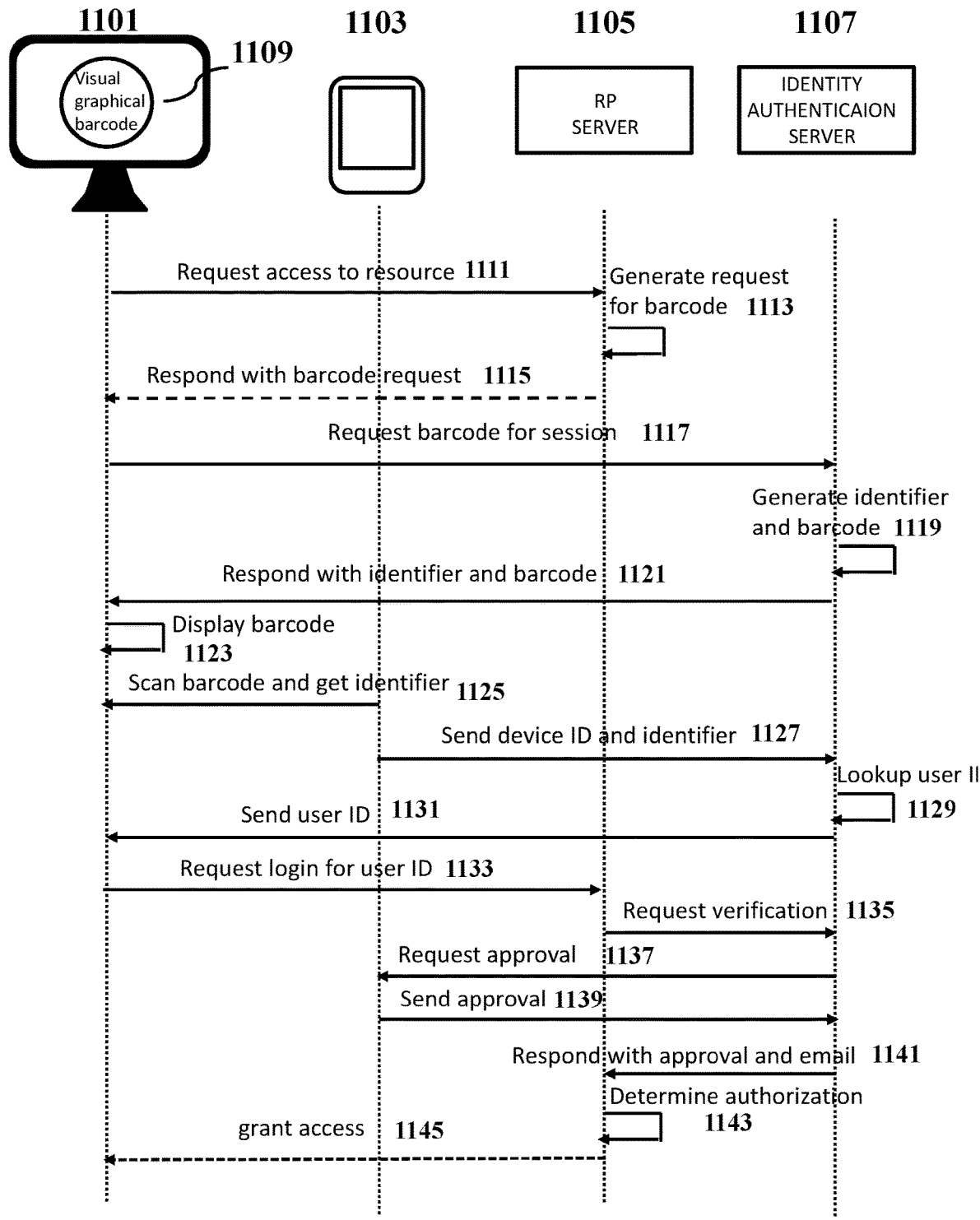
FIG. 11 illustrates an exemplary method for authenticating a user with a relying party using visual graphical barcode.

FIG. 11 illustrates an exemplary method for authenticating a user with a relying party. The method may provide authentication of a user with multiple relying parties. The relying party may allow authenticated user to access resources, for instance, protected data, a particular computing device, an account, a transaction, or a computing function. The relying party may authenticate the user for various purposes, such as for accessing a pre-existing user account or creating a new account. The relying party may employ one or more relying party servers 1105 and a user may seek to access services provided by the relying party via an accessing device 1101 or the user device 1103. The user may be authenticated by an identity authentication server 1107 via the user device 1103. The method may employ use of a visual graphical code. As illustrated in FIG. 11, the visual graphical code 1109 displayed on a device can be any type of graphical code as described previously herein. The visual graphical code may be referred to as visual graphical barcode or graphical authentication indicia. In some instances, the visual graphical code may be a one-time visual graphical code. The visual graphical code may expire or time out after a certain period of time or once they have been validated. The visual graphical code may be a barcode as described elsewhere here. In some cases, the visual graphical code may be a QR code as described in FIG. 1. Alternatively, the visual graphical code may be presented to user as a physical object. The visual graphical code may be on a physical element possessed by a user. The physical element may be a card (ID card, driver license, payment card, library card, login card, etc), documents (passport, legal document, healthcare record, etc), and the like that are issued or provided by an entity or service provider. In other instances, visual graphical code can be displayed on a display device. In some embodiments, the display device may be the accessing device provides user access to an account or to complete a transaction. Alternatively, the display device may not be the accessing device. The display device may be a computer (e.g., laptop computer, desktop computer), a mobile device (e.g., smartphone, tablet, pager, personal digital assistant (PDA)), a vending machine or the like requiring authentication or verification of the user to conduct a session or transaction utilizing the display device to complete the transaction running on a server (i.e. service provider). The display device may optionally be portable. The display device may be handheld. A user device 1103 may be used to scan the visual graphical barcode for authentication process. The user device can be the same user device 104 as described in FIG. 1.

In some embodiments, a user may desire to access content or services provided by a relying party (RP) server 1105 via an accessing device 1101. For example, the user may try to access services using a browser executing on the accessing device. In another example, the user may try to access services using a browser executing on the user device. The browser may generate and transmit the request to the RP server for accessing to resource or for authentication 1111. In some cases, the user may not be required to input a user credential (PIN) or user identifier (username) in order for the browser to send the request. In some cases, a request for authentication may be generated in response to a user input indicating a login action or authentication action. For instance, a user may click on a login button indicating the login action. Alternatively, the user may need to input a user credential or user identifier in order to send the request. Next, the RP server may generate a request for a visual graphical barcode (e.g. QR code) 1113 and send the request for barcode to the accessing device 1115. In some embodiments, the RP server may generate the request for barcode using Application Programming Interface (API) or software development kit (SDK) provided by the identity authentication server 1107. Optionally, the user may be prompted on the accessing device about using the visual graphical barcode. The browser running on the accessing device may generate and transmit a request for the associated authentication or login session to the identity authentication server 1117.

In response to the request, the identity authentication server may generate a visual graphical barcode along with an identifier uniquely associated with the barcode 1119. The visual graphical barcode may be a one-time barcode. In some embodiments, the identifier may be encoded in the barcode to associate with the service session with the barcode. The one-time barcode may be encoded with information such as the RP server ID, service provider identity or session ID as described elsewhere herein. Next, the one-time visual graphical barcode is sent to the accessing device 1121. In some embodiments, the one-time barcode may be refreshed at certain time interval. For instance, the one-time barcode may be refreshed every 10 s, 20 s, 30 s, 40 s, 60 s, 120 s, 5 minutes, 10 minutes, and the like. In this case, the one-time barcode may be regenerated with refreshed information such as a new session ID or timestamp while pertaining to the same. The one-time barcode may be refreshed when it is not scanned. This may be beneficial to avoid QR code hijacking and various other attacks.

The visual graphical barcode is displayed on a display of the accessing device 1123. The display may be operably coupled to the accessing device. The display may be comprised by the accessing device. The user may scan the visual graphical code using the user device 1125. In some cases, nonce data may be collected during scanning. The captured visual graphical code may be decoded and processed by the application or software that is provided by the identity authentication server 1107 and running on the user device. In some instances, the image data of the visual graphical code may be directly sent to the identity authentication server along with the device ID. In other instances, the application or software may process the captured code (e.g. decode the code or decrypt the decoded data) and send the decoded information such as the identifier along with the device ID to the identity authentication server 1127. In some embodiments, in addition to the identifier and the device ID, nonce data may also be included to detect anti-replay attack.

The identity authentication server may use the device ID to identify an associated user 1129. In some cases, a user ID may be a user identifier such as a user name or user account that is used to register the user with the identity authentication server. The user ID may or may not contain private information about the user. In some cases, the user ID may be a user identifier used only by the identity authentication server. The user ID may be transmitted to the accessing device 1131 to confirm continuing the process for the associated user ID. A user may confirm request for accessing services or authentication for the user ID via the accessing device and a request for accessing services provide by the RP server user the user ID is transmitted to the RP server 1133. The RP server may then send a request for verifying the user ID to the identity authentication server 1135.

Next, the identity authentication server sends a request to the associated user device for approval of verifying the user identity 1137. For instance, the user may be prompted on the user device indicating verification or authentication is requested by the relying party or granting permission to proceed with the service provided by the relying party. The request may be sent via the federated account such as the email address. The federated account may be used as a single authenticated service account that can be re-used across multiple online services. Various other accounts can be employed such as social network account, email address and the like. The federated account may be used to establish a connection of the user to various relying parties in a federated manner also provide an additional authentication channel between the user and the identity authentication server. In some cases, the request may be sent via the application running on the user device. This approval step may add additional security to the authentication process. It may be beneficial of being able to quickly detect and eliminate the risk of QR code hijacking and various other attacks. In some cases, the user can choose not to approve the request, for instance, when the user does not recognize the relying party or the service that requests authentication. It may be indicative of a fraudulent event. In this case, the identity authentication server may not provide any user related information to the relying party.

An approval for authenticating the user identity may be transmitted to the identity authentication server when the user recognizes the relying party or the service 1139. Accordingly, the identity authentication server sends a federated account such as email address used at least by the RP server for the RP server to identify the user 1141. The RP server may determine authorization to the services or information as requested by the user associated with the federated account 1143 and grant access to the user on the accessing device 1145. In some cases, the RP server may not recognize the federated account so the RP server may determine to create a new account for the user. In this case, the identity authentication server may further provide user information retrieved from a user information requirement data to the RP server. The process for the identity authentication server to provide user information for opening a new account with the RP server may include: identifying the required user information categories from a user information requirement data for the RP service provider, the identity proofing and authentication system may, next, retrieve user information for the selected categories and provide the selected user information to the RP service provider. This process may be the same as described with respect to FIG. 4. In some cases, instead of or in addition to the federated account, information related to the user identity may be provided by the identity authentication server to the RP server. The identity authentication server may determine the type of information related to an authenticated user to be provided to the RP server. For example, for different RP servers or different services, different type of information may be provided. The information provided to a banking server may be different from the information provided to a healthcare insurance server. In some cases, once a user is authenticated, only a federated account or user identifier that is recognizable by the associated RP server may be provided which may minimize the risk of exposing user information to a malicious party. The identity authentication server may not need to have access to the user related information or services stored with the RP server. For example, when the RP server is a banking server, financial account of the user may not be accessible by the identity authentication server. In some cases, the federated account may be the only information shared between the RP server and the identity authentication server. In some cases, additional user related information such as user name, device ID, address and the like may be shared between the RP server and the identity authentication server.

It should be noted that the method should not be limited to the process as described above. One or more steps may be skipped or the order of the steps may vary according to different applications. For example, the steps 1137, 1139 for user approval of the authentication may be optional such that a user may be automatically approved or authenticated by scanning a visual graphical barcode without providing additional user input.

Anti-replay protection may be included in one or more steps during the authentication process. Anti-replay feature may be used, for instance, when the user sends approval from the user device to the identity authentication server or sends the device ID and identifier to the identity authentication server. For example, nonce data relating to the user device used to provide user credentials may be captured and used as anti-replay protection. The nonce data can be related to various factors, such as the device used for authentication or credential delivery, and the credential itself, etc. The nonce data may change with respect to time, geo location, motion, device status and any environmental factors. The anti-replay feature can be generated at any time. For example, the anti-replay protection may be generated at the time a barcode is scanned before transferring it to an authentication system. The anti-replay protection may be generated at the time an approval request is provided by the user. For instance a location of the user touching a screen of the user device for approval of verification can be used as nonce data. The anti-replay protection may include anti-replay features as described elsewhere herein.

Figure 12:
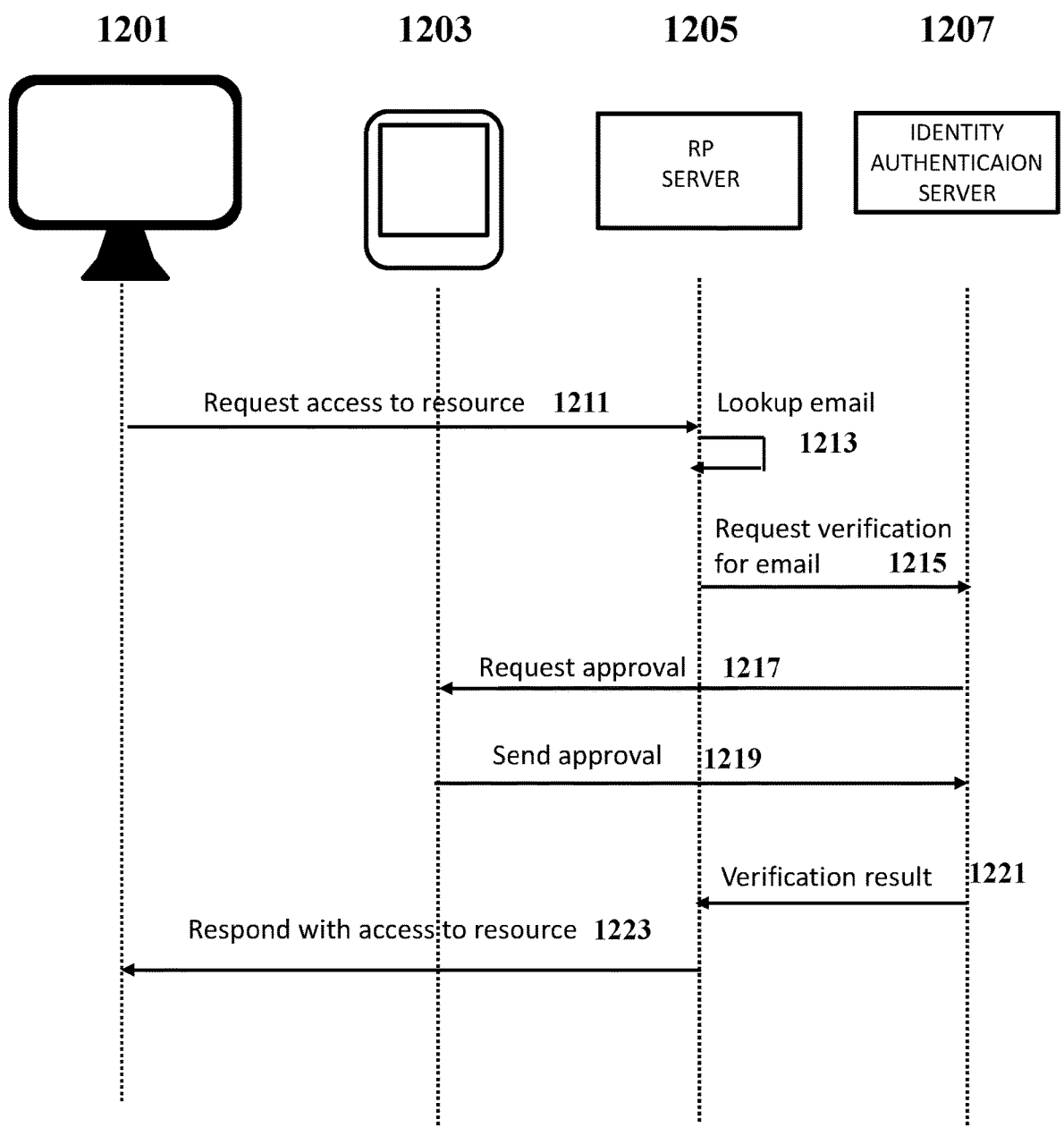
FIG. 12 illustrates an exemplary method for authenticating a user with a relying party.

In some embodiments, an authentication method without using a visual graphical barcode may be provided. With respect to FIG. 12, the method is illustrated in accordance with embodiments of the invention. Similar to the authentication process as described above, a user may desire to access content or services provided by a relying party (RP) server 1205 via an accessing device 1201. For example, the user may try to access services using a browser executing on the accessing device. In another example, the user may try to access services using a browser executing on the user device. The browser may generate and transmit the request to the RP server for accessing to resource or for authentication 1211. In some cases, the user may not be required to input a user credential (PIN) or user identifier (username) in order for the browser to send the request. In some cases, a request for authentication may be generated in response to a user input indicating a login action. For instance, a user may input a federated account such as email address to indicate a request to login to the account. The RP server 1205 may look up the federated account in a database accessible to the RP server 1213 then send a request to the identity authentication server 1207 for a verification of the federated account such as the email address 1215. The identity authentication server may send a request to a user device 1203 associated with the federated account 1217 for approval of verifying the user identity. The request may be sent via the federated account such as the email address. The request may be sent via the application running on the user device. If the user approves to proceed with verification, an approval may be transmitted form the user device to the identity authentication server 1219. Upon receiving the approval, the identity authentication server may send the verification result associated with the federated account to the PR server 1221. Next, the RP server may grant access to the resource or services to the user on the accessing device 1201. In some cases, the RP server may not recognize the federated account so the RP server may determine to create a new account for the user. In this case, the identity authentication server may further provide user information retrieved from a user information requirement data to the RP server. The process for the identity authentication server to provide user information for opening a new account with the RP server may include: identifying the required user information categories from a user information requirement data for the RP service provider, the identity proofing and authentication system may, next, retrieve user information for the selected categories and provide the selected user information to the RP service provider. This process may be the same as described with respect to FIG. 4. It should be noted that the user device may be pre-registered with the identity authentication system as described elsewhere herein, such that an association of the device ID and the federated account may be pre-stored in a database accessible by the identity authentication server.

As described previously, the relying parties may be implemented on one or more standalone data processing apparatuses or a distributed network of computers. The one or more relying parties may comprise one or more RP servers. In some cases, one or more RP servers may be implemented in software, hardware or a combination of both. The RP servers may be, for example, banking website, government service website, social networking websites, automated banking machines, point of sale machines, virtual private network systems, healthcare system, or other enterprise servers. In the example as illustrated in FIG. 13, the RP service provider is a transaction server 1307 and the device 1309 used for performing transactions with a user 1303 may be an automated banking machine or point of sale machine.

Figure 13:
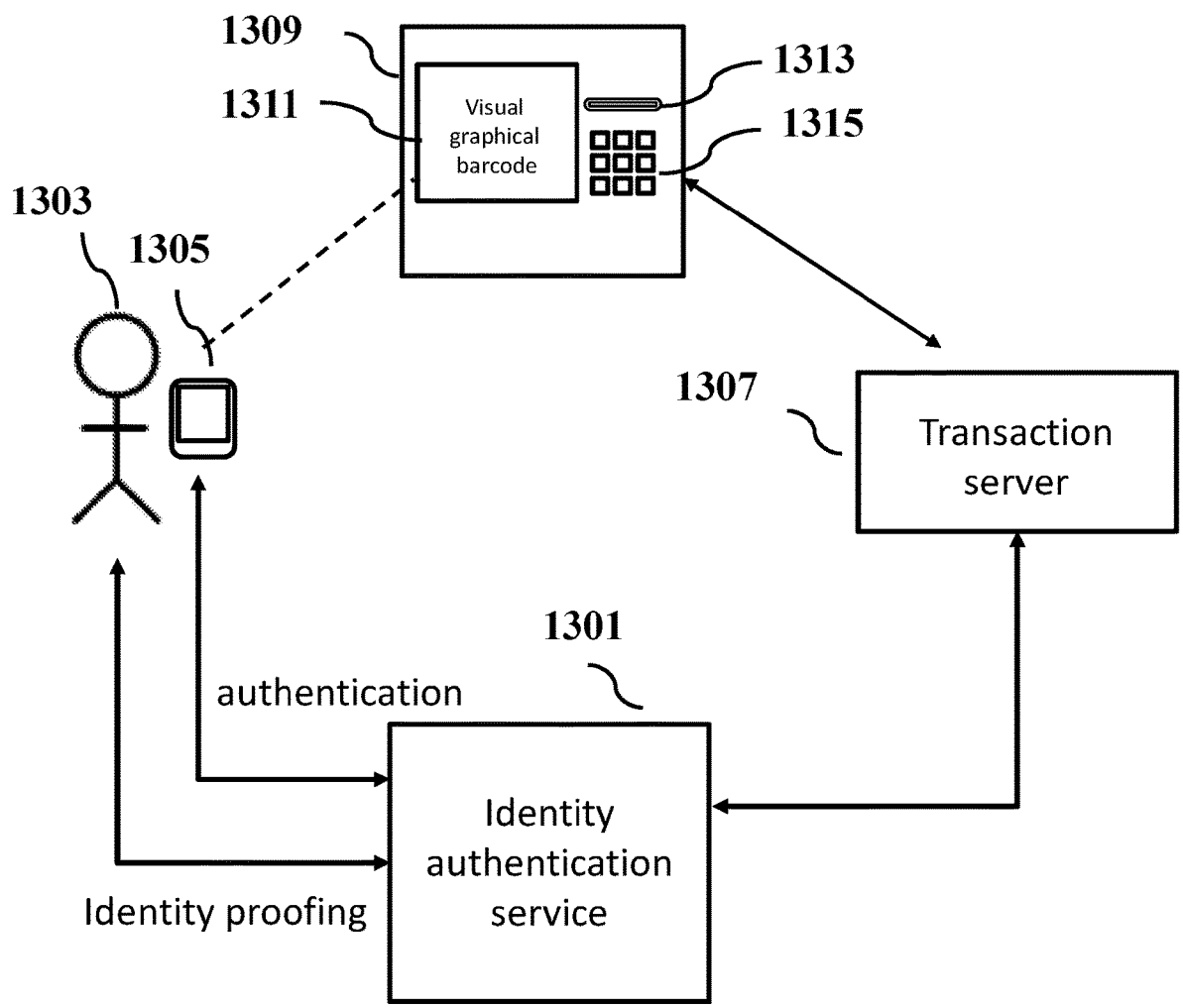
FIG. 13 schematically illustrates an exemplary system implementing an identity proofing and authentication method.

FIG. 13 schematically illustrates an exemplary system implementing an identity proofing and authentication method. The identity authentication services may be used to protect various activities requiring identity authentication. The activities may or may not include the exchange of money, goods, services, and/or information. The method or system may be used to grant access to sensitive and valuable assets such as institutional banking accounts, brokerage accounts, or financial services. In the illustrated example, the accessing device 1309 may be an Automated Teller Machine (ATM), point of sale machine or kiosks. A user 1303 may be authenticated in order to perform a transaction (e.g., access bank account, cash withdrawal, deposit, printed account statement, swipe a card, etc) via the accessing device 1309.

The user 1303 may or may not register to the identity authentication service 1301 prior to the activity/transaction. In some cases, the user may register to the identity authentication service 1301 by proofing an identity of the user as described elsewhere herein. For example, different identity documents or materials may be used to uniquely identify a user. The identity-proofing assurance level may be affected by different security levels of the identity documents and also affected by how the identity proofing document is presented and examined.

During the registration, a user may be required to present an identity proofing document with various security features. The identity documents can be authenticated in a variety of ways: signal, seal, special papers and inks, high quality engraving, holograms, cryptographic techniques etc that make the identity documents recognizable and difficult to copy or forge. Various types of identity documents haven been well discussed elsewhere herein.

During the registration process, an identity document may be presented or examined at different trust or confidence level. An identity document may be presented in different ways. The different ways may be in-person proofing, remote proofing or online proofing. In some cases, the different ways may be categorized into multiple levels as described elsewhere herein. For example, the first level of identity proofing assurance may not require an identity proofing document. A user may be asked to provide a federated account such as an email account to establish an access to services provided by the identity authentication service system 1301. The federated account may be used as a single authenticated service account that can be re-used across multiple online services. For example, the user account may be used to establish a connection of the user to the transaction service provider such as the financial institution. Various other accounts can be employed such as social network account, email address and the like. The federated account may be provided as a user identifier for uniquely identifying a user by the financial institution meanwhile providing a communication or verification channel between the user and the bank/identity authentication service system. In some embodiments, the second level of identity proofing may require one or more identity proofing documents or third party record, such as a driver license or a passport or a healthcare record to be inspected remotely, such as a remote scan. In some embodiments, the third level of identity proofing may require an in-person identity proofing to inspect one or more identity proofing documents with the high security level, such as a passport with NFC chip. In some cases, at all levels, a federated user account such as the email account may be required.

In some embodiments, the users 1303 may provide their identity or an email address to the identity authentication service 1301 when they register to the identity authentication service system. The identity authentication service system may perform identity proofing of the user by requiring identity proofing document via certain presentation means. Once the identity of the user is proved, the identity authentication service 1301 may or may not issue one or more credentials to the users. The credentials can be used for later authentications. In some cases, once the identity of the user is proved, an access to the authentication services provided by the identity authentication service system may be established. For instance, the user may be allowed to use barcode scanning functions provided by a mobile application running on the identity authentication server. The credentials may be generated later as needed such as a QR code. As described previously, other different credentials may be used to authenticate a user. The credentials may or may not contain an identity of the user. Optionally the credentials may or may not contain attributes to the identity of the user. For example, the credential may contain verified name of the real user or pseudonyms. The credentials can be any form. The credentials may be physical object such as a physical token that can be possessed and controlled by a user (e.g., paper credential, card, finger print reader, card reader, etc). The credentials may be electronic such as digital document that can be stored as data. The credentials can be secret information that the user knows such as user name and password. The same credentials may be used repeatedly for different authentication processes. Different credentials may be used for different authentication processes.

The identity authentication service 1301 may provide authentication services at different levels of assurance. In some embodiments, the first level may be a two-factor authentication. The first level of authentication may require something you know (e.g., PIN) and/or something you are (e.g. biometrics). For instance, a user may be asked to input a PIN or provide a fingerprint via a user device. In some instances, the PIN is used for accessing the authentication application installed on the user device and provided by the user through the user device. In some instances, the PIN may be used for accessing the ATM and provided by the user via the ATM. In some cases, anti-replay features may be provided along with the credentials. In some embodiments, the second level may include an additional factor relative to the first level. In some cases, the additional factor may be scanning of a visual barcode or an identity proofing document (e.g., PDF 417 on a driver license) or scanning visual graphical barcode displayed on an external device. For example, the first level of authentication may require a user to input a PIN or biometrics of the user at the user device to activate an app provided by the authentication system and the second level of authentication may require the user to scan a visual graphical barcode using the user device. This additional factor may be something you have. In some embodiments, the third level may include use of a physical token such as a magnetic card to provide additional security relative to the second level. In some embodiments, some or all of the authentications are performed via a mobile application running on the user device 1305. In some cases, the user device 1305 may be pre-registered with the identity authentication service system and have a unique device ID stored in a database that is accessible by the identity authentication service system.

The one or more users 1303 may perform one or more transactions through the device (e.g., ATM) provided by the relying party (e.g., financial institution, bank) 1307. The relying party may be a financial services institution. The relying party may be a bank or other type of financial services institution such as an insurance company, a credit union, a brokerage company, a mortgage company, an investment services company, or a combination thereof. The transactions may include, but not limited to, access bank account, cash withdrawal, deposit, printed account statement, swipe a card and the like. Authentication may be required for performing the transactions. Typically a user may be required to enter personal identification number (PIN) or account information to verify identity of a user. However such authentication method may increase the inconvenience that a user is required to memorize the PIN as well as the risk of phishing attack or eavesdropping. The provided method and system may allow for a user to access the RP-protected resource via the ATM without physically inputting a password. The authentication may be performed by an identity authentication service 1301 via the user device. The identity authentication service 1301 will provide the verified user identity or approved user identifier to the financial institution. The identity authentication service can be the same as the identity authentication service as described in FIG. 10.

The one or more users may perform transactions provided by the one or more relying-parties via one or more accessing device 1309. The accessing device can be any devices provided by a financial institution such as an ATM or point of sale machine. The accessing device may or may not be portable. A user may access account information or financial services provided by the transaction server 1307 via the ATM. The accessing device may be handheld. In some embodiments, the accessing device can be the same as display device as described in FIG. 1. In some cases, the ATM may comprise a display 1311, card reader 1313, user interface 1315, cash module, a processor or a communication module.

The ATM or point of sale machine may comprise a display 1311 configured to display one or more visual graphical barcode for authentication of a user. The display is used to display various information related to a user account, services, and the like. The display can be any type of display screen such as a liquid crystal display (LCD), cathode ray tube (CRT), light emitting diode (LED) display, touchscreen, electronic paper (e-paper) display, or a display on a separate computing device. The ATM or point of sale machine may also comprise a card reader 1313. The card reader may comprise any type of device for reading information from a bank or credit card. For example, the card reader may be configured to read magnetic strips, a chip and the like. The ATM or point of sale machine may comprise a user interface 1315. The user interface can comprise any type of device for receiving a user input. The user interface may include, for example, a keyboard, mouse, touchscreen, keypad, or button array. The user interface may include input device of various other types configured for receiving a voice command, a finger print and the like. The ATM or point of sale machine may optionally comprise a cash module which dispenses cash withdrawals, receives cash deposits, or both. The ATM may comprise one or more processors configured to run an ATM software in order to perform the one or more transactions and services at the ATM.

The identity authentication service 1301 may include authorized agent who is capable to authenticate identity proofing document in-person or remotely. The identity authentication service can be the same as the identity authentication server as described in FIG. 10. The identity authentication service 1301 may be configured to perform various authentications as required by various transactions as discussed above. The various authentications may include verifying user credentials with or without anti-replay features. The various functionalities of the identity authentication service may be facilitated by use of one or more processors. The identity authentication service may be facilitated by and/or have access to one or more databases. The identity authentication service may be implemented on one or more standalone data processing apparatuses. Alternatively, the identity authentication service may be implemented on one or more processing apparatuses and/or databases offered by a distributed network of computers (e.g., peer-to-peer or cloud-computing based infrastructure). One or more functionalities of the identity authentication service may be part of a server or accessed by a server.

The identity authentication service may be in communication with one or more user devices and/or one or more user credentials 1305. In some instances, the authentication service may be in communication with various user devices and/or user credentials with aid of a communication unit (e.g., an I/O interface). The identity authentication service may be in communication with the transaction server 1307. In some instances, the identity authentication server may be in communication with the accessing device 1309. The identity authentication service may be in communication with the transaction server or the ATM with aid of one or more I/O interfaces. For example, the I/O interface may facilitate the processing of a user input associated with a request for secure authentication. Alternatively, the identity authentication server may be in communication with the transaction server only and not in communication with the ATM.

The user devices, accessing devices (e.g., ATM), transaction server or identity authentication servers may communication with each other via one or more communication networks. The communication network(s) may include local area networks (LAN) or wide area networks (WAN), such as the Internet. The communication network(s) may comprise telecommunication network(s) including transmitters, receivers, and various communication channels (e.g., routers) for routing messages in-between. The communication network(s) may be implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocols. The communication between the accessing device (e.g., ATM) and the transaction server may include banking network. Banking network may include any number of membership organizations, banks, credit unions, or financial institutions. The banking network can use a variety of interaction methods, protocols, and systems. For example, a banking network may use any of the automated clearing house (ACH) networks. An ACH network may be operated by NACHA (previously referred to as the National Automated Clearing House Association). Another ACH network may be the Electronic Payments Network (EPN). These ACH networks may interact to settle ACH transactions involving a party that has a relationship with only NACHA's ACH network or only the EPN. Other banking networks, such as CIRRUS, NYCE, and PULSE may also be used. In some cases, ATM networks such as an interbank ATM network and/or intrabank ATM network may be included to enable the communication between the ATM and the transaction server.

The one or more user devices 1305 may be in communication with the identity authentication service with respective credentials. In some instances, a user device may be a user credential. The user device may be used to scan a visual barcode displayed on the accessing device 1309 for authenticating the user. The user device may be a computing device that is capable of executing software or applications provided by one or more identity authentication service systems. In some embodiments, the software and/or applications may allow the user to scan a visual graphical barcode such as a QR code displayed on another device, and transmit authentication data between the user device and identity authentication service system during an authentication session. The software and/or application may have been registered with the identity authentication service system by the user. Optionally, the software and/or application need not be registered with the identity authentication service system, and only the user device may be registered with the authentication system. Thus the device may have a device ID stored in a memory accessible to the identity authentication system. The user device can be the same as the user device as describe in FIG. 10. In some embodiments, a visual graphical barcode based authentication method is provided for performing a financial transaction.

Figure 14:
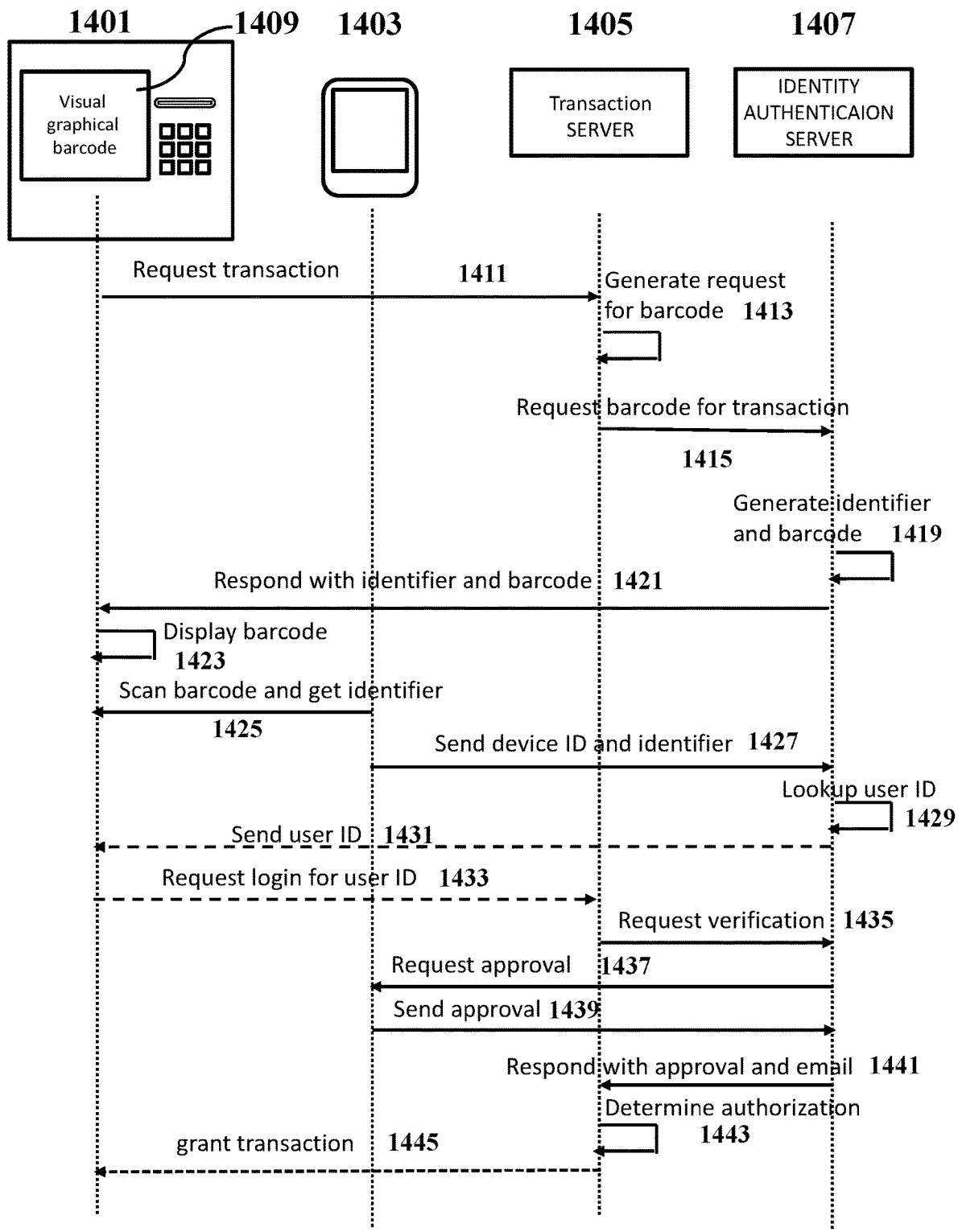
FIG. 14 illustrates an exemplary method for authenticating a user with a financial institution.

FIG. 14 illustrates an exemplary method for authenticating a user with a relying party using a visual graphical barcode. A user may perform authentication during a transaction by scanning a visual graphical code. For instance, instead of inputting a PIN or password at the ATM, a user may be authenticated by scanning a QR code displayed on the ATM. The relying party may be a financial institution. The relying party may employ one or more transaction servers 1405 and a user may seek to perform transaction provided by the relying party via an accessing device 1401. The user may be authenticated by an identity authentication server 1407 via the user device 1403. The method may employ use of a visual graphical code. The visual graphical code 1409 displayed on a display of the accessing device can be any type of graphical code as described previously herein. The visual graphical code may be referred to as visual graphical barcode or graphical authentication indicia. In some instances, the visual graphical code may be a one-time visual graphical code. The visual graphical code may expire or time out after a certain period of time or once they have been validated. The visual graphical code may be a barcode as described elsewhere here. In some cases, the visual graphical code may be a QR code as described in FIG. 1. The visual graphical code may be displayed on a display screen of the accessing device. The accessing device may require authentication or verification of the user to conduct a session or transaction. The transaction may involve service provided by the transaction server 1405. The accessing device can be the same as the accessing device as described in FIG. 13. A user device 1403 may be used to scan the visual graphical barcode for the authentication process. The user device can be the same as the user device 104 as described in FIG. 1.

A user may desire to access an account or perform transaction provided by the transaction server 1405 via an accessing device 1401 (e.g., ATM or point of sale machine). For example, the user may try to access a bank account or withdraw/deposit money through the cash module of the accessing device. A transaction may be requested via various ways depending on the protocols of the ATM or point of sale machine. For instance, a user may request a service or transaction associated with a user account by inserting a bank or credit card into a card reader of the ATM or select a service displayed on the screen. A processor of the ATM may generate and transmit the request to the transaction server for authentication. The user may not be required to input a user credential (PIN) or user identifier (username) in order for the ATM to send the request. In some cases, a request for authentication may be generated in response to a user input indicating performance of a transaction or authentication action. For instance, a user may press on a button or select on the display screen indicating a selected service. Alternatively, the user may need to input a user credential or user identifier such as inserting a bank or credit card into a card reader in order to send the request. Next, the transaction server may generate a request for a visual graphical barcode (e.g. QR code) 1413 and send the request for barcode to the identity authentication server 1415. In some embodiments, the transaction server may generate the request for barcode using Application Programming Interface (API) or software development kit (SDK) provided by the identity authentication server 1407. The software running on the transaction server may generate and transmit a request for the associated authentication or session to the identity authentication server.

In response to the request, the identity authentication server may generate a visual graphical barcode along with an identifier uniquely associated with the barcode 1419. The visual graphical barcode may be a one-time barcode. In some embodiments, the identifier may be encoded in the barcode to associate with the service session with the barcode. The one-time barcode may be encoded with information such as the accessing device ID, service provider identity or session ID as described elsewhere herein. Next, the one-time visual graphical barcode is sent to the accessing device 1421. Alternatively, the one-time visual graphical barcode may be sent to the transaction server then the transaction server may relay the one-time visual graphical barcode to the associated ATM. In some embodiments, the one-time barcode may be refreshed at certain time interval. For instance, the one-time barcode may be refreshed every 10 s, 20 s, 30 s, 40 s, 60 s, 120 s, 5 minutes, 10 minutes, and the like. In this case, the one-time barcode may be regenerated with refreshed information such as a new session ID or timestamp while pertaining to the same transaction until it is validated. The one-time barcode may be refreshed when it is not scanned. This may be beneficial to avoid QR code hijacking and various other attacks.

The visual graphical barcode is displayed on a display of the accessing device 1423. The display may be operably coupled to the accessing device. The display may be a component of the accessing device. The user may scan the visual graphical code using the user device 1425. In some cases, nonce data may be collected during scanning. The captured visual graphical code may be decoded and processed by the application or software that is provided by the identity authentication server 1407 and running on the user device. In some instances, the image data of the visual graphical code may be directly sent to the identity authentication server along with the device ID. In other instances, the application or software may process the captured code (e.g. decode the code or decrypt the decoded data) and send the decoded information such as the identifier along with the device ID to the identity authentication server 1427. In some embodiments, in addition to the identifier and the device ID, nonce data may also be included to detect anti-replay attack. In some cases, the user may be required to log in to the application or software using one or more user credential such as finger print or password. The user credential may be required when the application is initiated or when a scanning is to be performed.

The identity authentication server may use the device ID to identify an associated user 1429. In some cases, a user ID may be a user identifier such as a user name or user account that is used to register the user with the identity authentication server. The user ID may or may not contain private information about the user. In some cases, the user ID may be a user identifier used only by the identity authentication server. In some instances, the user ID may be transmitted to the accessing device 1431 to confirm continuing the process for the associated user ID. For example, the user ID such as email account may be displayed on the display screen of the ATM. A user may confirm request for authentication for the user ID via the accessing device (e.g., a tap on the screen, press a button on keyboard), then a request for accessing services provide by the transaction server using the user ID is transmitted to the transaction server 1433. Alternatively, the user ID may be sent to the transaction server directly instead of the ATM. The transaction server may then send a request for verifying the user ID to the identity authentication server 1435.

Next, the identity authentication server sends a request to the associated user device for approval of verifying the user identity 1437. For instance, the user may be prompted on the user device indicating verification or authentication is requested by the transaction server or granting permission to proceed with the service provided by the transaction server. The request may be sent via the federated account such as the email address. The federated account may be used as a single authenticated service account that can be re-used across multiple services as described elsewhere herein. In some cases, the request may be sent via the application running on the user device. This approval step may add additional security to the authentication process. It may be beneficial of being able to quickly detect and eliminate the risk of QR code hijacking and various other attacks. In some cases, the user can choose not to approve the request, for instance, when the user does not recognize the bank or the service that requests authentication. It may be indicative of a fraudulent event. In this case, the identity authentication server may not provide any user related information to the transaction server.

An approval for authenticating the user identity may be transmitted to the identity authentication server when the user recognizes the bank or the service 1439. Accordingly, the identity authentication server sends a federated account such as email address used at least by the transaction server for the server to identify the user 1441. The transaction server may determine authorization to the services or information as requested by the user associated with the federated account 1443 and grant transaction on the accessing device 1445. In some instances, if a bank or credit card is read by the ATM, the transaction server may also compare the federated account with pre-stored user related information associated with the bank or credit card to determine authorization to the services. In some cases, instead of or in addition to the federated account, information related to the user identity may be provided by the identity authentication server to the transaction server. The identity authentication server may determine the type of information related to an authenticated user to be provided to the transaction server. In some cases, once a user is authenticated, only a federated account or user identifier that is recognizable by the associated transaction server may be provided which may minimize the risk of exposing user information to a malicious party. The identity authentication server may not need to have access to the user's financial account or service provided by the transaction server. In some cases, the federated account may be the only information shared between the transaction server and the identity authentication server. In some cases, additional user related information such as user name, device ID, address and the like may be shared between the transaction server and the identity authentication server.

It should be noted that the method should not be limited to the process as described above. One or more steps may be skipped or the order of the steps may vary according to different applications. For example, the steps 1437, 1439 for user approval of the authentication may be optional such that a user may be automatically approved or authenticated by scanning a visual graphical barcode without providing additional user input.

Figure 15:
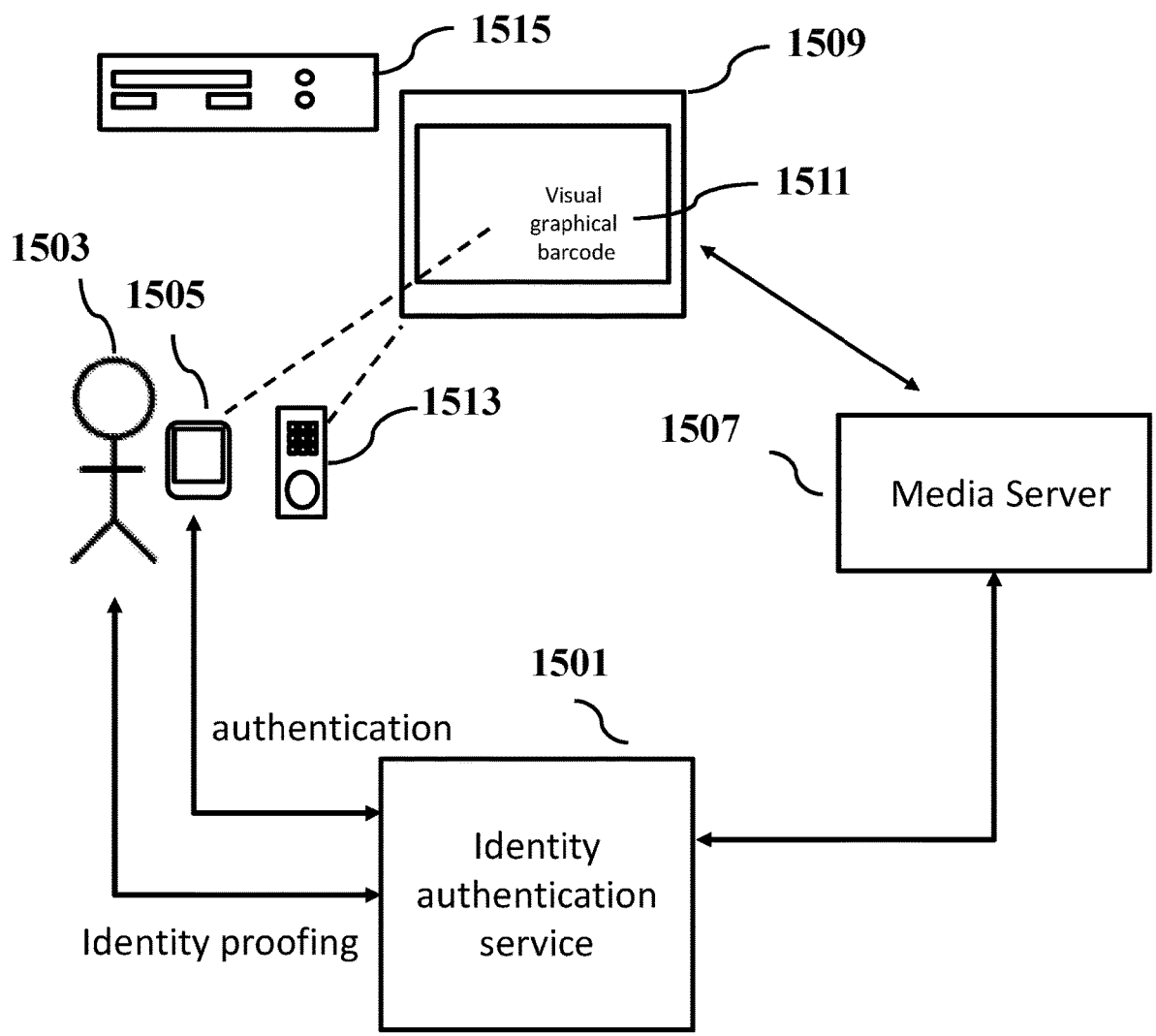
FIG. 15 shows an example of performing authentication for a transaction via a TV.

As described above, the authentication system and method can be used in conjunction with various types of transactions. In some cases, as long as the transaction involves a display device, a visual graphical code based authentication can be performed. The various transactions should not be limited by the examples illustrated herein. FIG. 15 shows an example of performing authentication for a transaction via a TV 1509. The TV 1509 may be a smart TV, connected TV or hybrid TV. The TV may be equipped with integrated Internet features such that to provide Internet TV, online interactive media, over-the-top content, on-demand streaming media, or home networking access in addition to traditional broadcasting media. The TV may comprise one or more processors to perform one or more transactions with a user 1503. The one or more processors may be provided on a set-opt box (STB) 1515 of the TV. In an example, the transaction may include accessing an online streaming, purchase apps, games or movies via the set-top box (STB) 1515. The STB may be configured to stream audio and video from an online resource provider, and may be connected to an external display, such as monitor or the television. The TV set may include a remote control 1513. The remote control may allow a user to control some basic functions of the TV, turn the TV on and off, adjust volume, or switch between digital and analog TV channels or between terrestrial and internet channel. The remote control may also allow a user to input transaction related information such as information required to login to a user account registered with a media server or any similar media service 1507, select a media for transaction, financial information for the transaction and the like.

The media server 1507 may provide any media or multimedia service to a user via the TV set. For instance, the media server may provide access to pre-recorded and/or live video streams. Various multi-media services may include but not limited to, streaming video content, music, photos, shows, apps, interactive advertising, social networking, voting, video-on-demand, and other content provided by the media server 1507. For a user to perform a transaction with the media server, an identity authentication service 1501 that is acceptable to the media server will authenticate the user identity using one or more credentials, and the identity authentication service 1501 will provide the verified user identity or approved user identifier to the media server. The one or more credentials may include using a visual graphical barcode 1511 displayed on the TV to authenticate the transaction or the identity of the user.

The user 1503 may desire to access a service such as streaming entertainment service (e.g., game, movie, or app) or purchase a product via the STB. During the process, the user may be authenticated in order to access the service or perform a transaction. In this case, the user may be authenticated by scanning a visual graphical barcode 1511 displayed on the television or monitor using a user device 1505. The authentication process can be the same as described elsewhere herein. The user 1503 and the user device 1505 may be the same as the user and user device as described in FIG. 10 or FIG. 13. The identity authentication service 1501 can be the same as the identity authentication service as described in FIG. 10. For example, when a user desires to purchase a media or service (e.g., game, app, or movie), a request may be submitted by the user via the TV or the remote control. The user may login to a user account registered with the media service provider by inputting a user account ID through the remote control and/or input instructions indicating the purchase. The identity authentication service 1501 may generated a QR code associated with the transaction and displayed on the monitor or TV screen 1509. The QR code may be displayed on a static image frame or displayed on top of dynamic image frames. For instance, the QR code may be displayed on a static transaction screen or displayed on top of a media that is being displayed. Alternatively or additionally, the authentication may be performed for the user to access the user account where pre-stored financial information with the user account may be used for the transaction once the identity of the user has been approved by the identity authentication service. The user may scan the QR code using the user device then the verified user identity may be transmitted by the identity authentication service to the media server in order to complete the transaction.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A network-enabled method for creating an online account using a network of devices, said method comprising:

(a) receiving, by an authentication system, a request to create an online account for a user with an online server;
(b) generating a visual graphical code in response to said request, by the authentication system, wherein the visual graphical code is configured to be displayed on a display screen and comprises a validation identity that is associated with the online server;
(c) receiving an image data of the visual graphical code from a user device with aid of optical detection apparatus, wherein the image data is acquired by capturing an image of the visual graphical code displayed on the display screen using an imaging device operably coupled to the user device and configured to optically detect the visual graphical code;
(d) processing said image data to extract the validation identity;
(e) verifying the validation identity is valid, and identifying an online service provider associated with the online server based on the validated validation identity;
(e) identifying a user information requirement associated with the online service provider by at least analyzing source code of a website of the online service provider;
(f) selecting, based on the extracted user information requirement, one or more user information categories associated with the online account without user input; and
(g) based on identification information related to the user, identifying the user, and providing personal information data for the selected user information categories to the online server, wherein the personal information data is required for creating the online account with the online server.

2. The method of claim 1, wherein the visual graphical code is a one-time barcode that is uniquely associated with opening the online account.

3. The method of claim 1, wherein the identification information related to the user comprises a device identifier of the user device.

4. The method of claim 1, further comprising consolidating different labels from different online serve providers into a label indicating a same user information category thereby matching the user information requirement with the one or more user information categories.

5. The method of claim 1, wherein the display screen is external to the user device.

6. The method of claim 5, further comprising identifying the one or more user information categories that is not pre-stored with the authentication system, and prompting the user to provide information according to the identified one or more user information categories via the user device.

7. The method of claim 1, further comprising receiving nonce data along with the image data for detecting a replay attack.

8. The method of claim 7, wherein the nonce data comprises at least two of the following: (i) one or more operational parameters of the imaging, (ii) positional information about the imaging device or the user device, and (iii) characteristics of the image data derived from image processing of the image data.

9. The method of claim 7, wherein the nonce data comprises data about a location of the user touching on a touch screen of the user device.

10. An authentication system for creating an online account using a network of devices, the system comprising:
an authentication server in communication with a user device configured to permit a user to create an online account with an online server, wherein the authentication server comprises:
(i) a memory for storing a set of software instructions, user information data for each of a plurality of users and a plurality of information categories associated with each of a plurality of users, and (ii) one or more processors configured to execute the set of software instructions to:
(a) receive a request to create an online account for a user with the online server;
(b) generate a visual graphical code in response to said request, wherein the visual graphical code is configured to be displayed on a display screen and comprises a validation identity that is associated with the online server;
(c) receive an image data of the visual graphical code from a user device with aid of optical detection apparatus, wherein the image data is acquired by capturing an image of the visual graphical code displayed on the display screen using an imaging device operably coupled to the user device and configured to optically detect the visual graphical code;
(d) process the image data to extract the validation identity;
(e) verify the validation identity is valid, and identify an online service provider associated with the online server based on the validated validation identity;
(e) identifying a user information requirement associated with the online service provider by at least analyzing source code of a website of the online service provider, and selecting one or more of user information categories from the plurality of user information categories based on the extracted user information requirement; and
(f) based on identification information related to the user, identify the user, and provide personal information data for the one or more selected user information categories to the online server, wherein the personal information data is required for creating the online account with the online server.

11. The system of claim 10, wherein the visual graphical code is a one-time barcode that is uniquely associated with opening the online account.

12. The system of claim 10, wherein the identification information related to the user comprises a device identifier of the user device.

13. The system of claim 10, wherein online service provider is pre-registered with the system.

14. The system of claim 10, further comprising receiving nonce data along with the image data for detecting a replay attack.

15. The system of claim 14, wherein the nonce data comprises at least two of the following: (i) one or more operational parameters of the imaging, (ii) positional information about the imaging device or the user device, and (iii) characteristics of the image data derived from image processing of the image data.

16. The system of claim 14, wherein the nonce data comprises data about a location of the user touching on a touch screen of the user device.

* * * * *